(12) United States Patent
Ogata

(10) Patent No.: US 9,459,433 B2
(45) Date of Patent: Oct. 4, 2016

(54) ZOOM LENS AND ZOOM LENS APPARATUS USING THE SAME

(71) Applicant: OLYMPUS CORPORATION, Tokyo (JP)

(72) Inventor: Yasuji Ogata, Tokyo (JP)

(73) Assignee: Olympus Corporation, Tokyo (JP)

( * ) Notice: Subject to any disclaimer, the term of this patent is extended or adjusted under 35 U.S.C. 154(b) by 72 days.

(21) Appl. No.: 14/572,372

(22) Filed: Dec. 16, 2014

(65) Prior Publication Data

US 2015/0168697 A1    Jun. 18, 2015

(30) Foreign Application Priority Data

Dec. 16, 2013   (JP) .................. 2013-259561

(51) Int. Cl.
| | | |
|---|---|---|
| *G02B 15/16* | (2006.01) | |
| *G02B 15/163* | (2006.01) | |
| *G02B 15/173* | (2006.01) | |
| *G02B 13/00* | (2006.01) | |

(52) U.S. Cl.
CPC ............. *G02B 15/16* (2013.01); *G02B 15/163* (2013.01); *G02B 15/173* (2013.01); *G02B 13/009* (2013.01)

(58) Field of Classification Search
CPC ... G02B 13/009; G02B 15/16; G02B 15/163
USPC ........................ 359/686, 687, 676
See application file for complete search history.

(56) References Cited

U.S. PATENT DOCUMENTS

| | | | |
|---|---|---|---|
| 6,094,312 A | 7/2000 | Nakayama | |
| 7,289,274 B1 | 10/2007 | Saori | |
| 7,848,028 B2 | 12/2010 | Ohtake | |
| 8,331,035 B2 | 12/2012 | Kon | |
| 8,339,712 B2* | 12/2012 | Hayakawa | G02B 15/173 359/676 |
| 8,416,506 B2 | 4/2013 | Ito | |
| 8,537,249 B2 | 9/2013 | Imaoka et al. | |
| 2015/0177498 A1* | 6/2015 | Iwasawa | G02B 15/177 348/240.3 |

FOREIGN PATENT DOCUMENTS

| | | |
|---|---|---|
| JP | 3466711 | 8/2003 |
| JP | 2007-212830 | 8/2007 |
| JP | 4560745 | 8/2010 |
| JP | 2010-191336 | 9/2010 |
| JP | 2011-232624 | 11/2011 |
| JP | 2012-047814 | 3/2012 |
| JP | 5068238 | 8/2012 |

* cited by examiner

*Primary Examiner* — Darryl J Collins
(74) *Attorney, Agent, or Firm* — Kenyon & Kenyon LLP

(57) ABSTRACT

A zoom lens includes in order from an object side to an image side, a first lens unit having a positive refractive power, a second lens unit having a negative refractive power, a third lens unit having a positive refractive power, and a fourth lens unit. At a telephoto end, with respect to a wide angle end, a distance between the first lens unit and the second lens unit widens, and a distance between the second lens unit and the third lens unit narrows. At the time of zooming from the wide angle end to the telephoto end, a distance between the third lens unit and the fourth lens unit changes, and the zoom lens satisfies the following conditional expressions (1) and (2).

$$1.1 < f_2/f_3 < 1.8 \quad (1)$$

$$-0.5 < \Delta G_1/\Delta G_2 < 0.5 \quad (2)$$

27 Claims, 22 Drawing Sheets

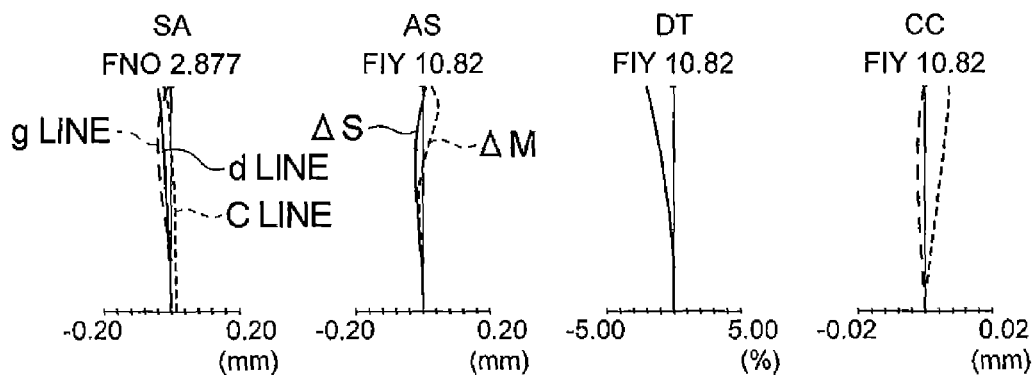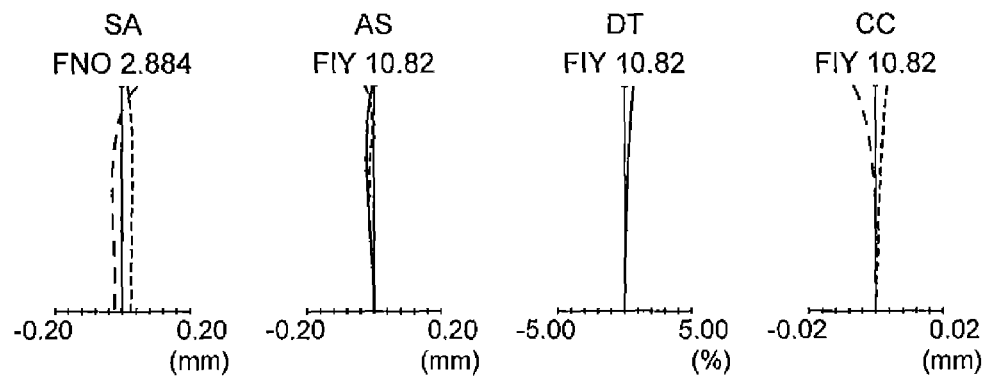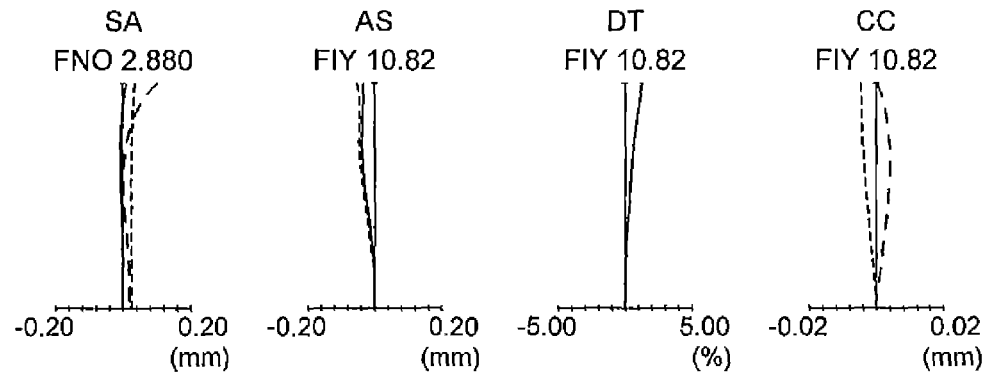

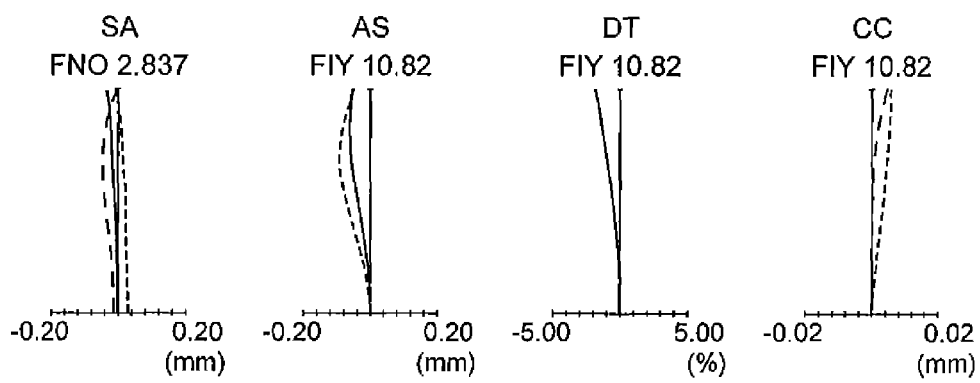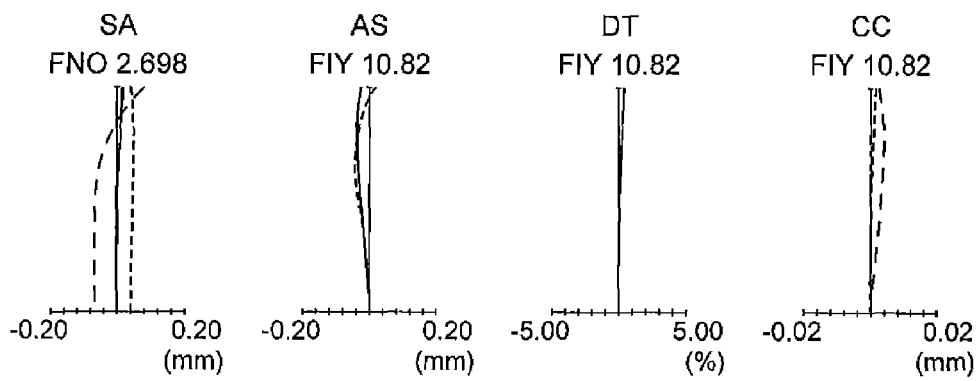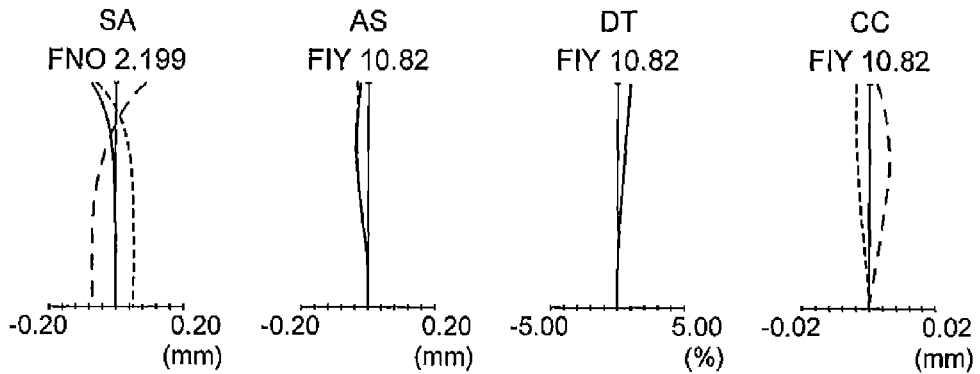

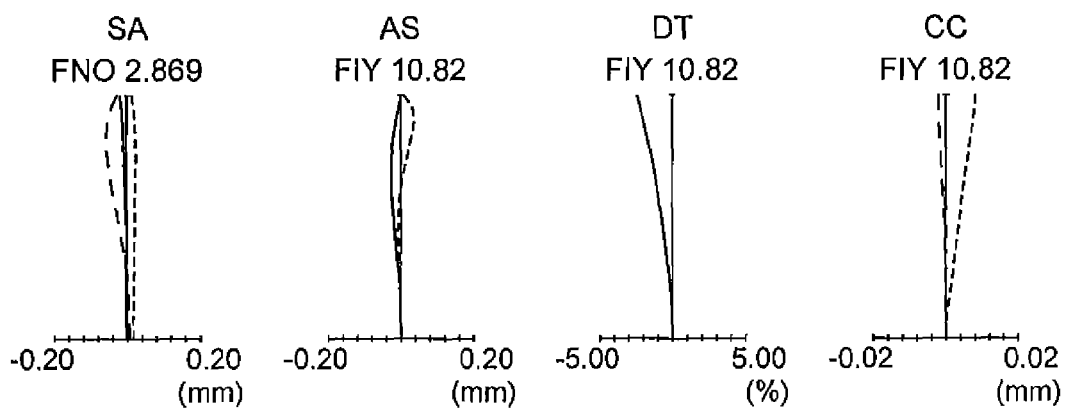
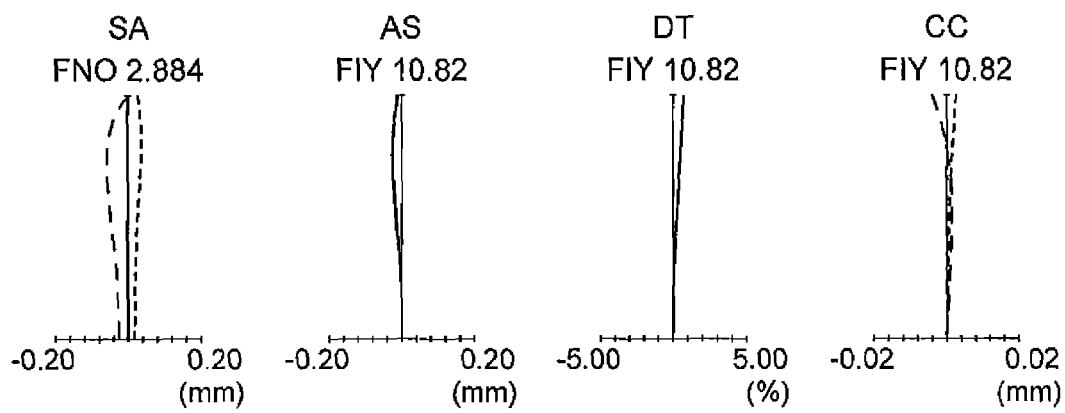
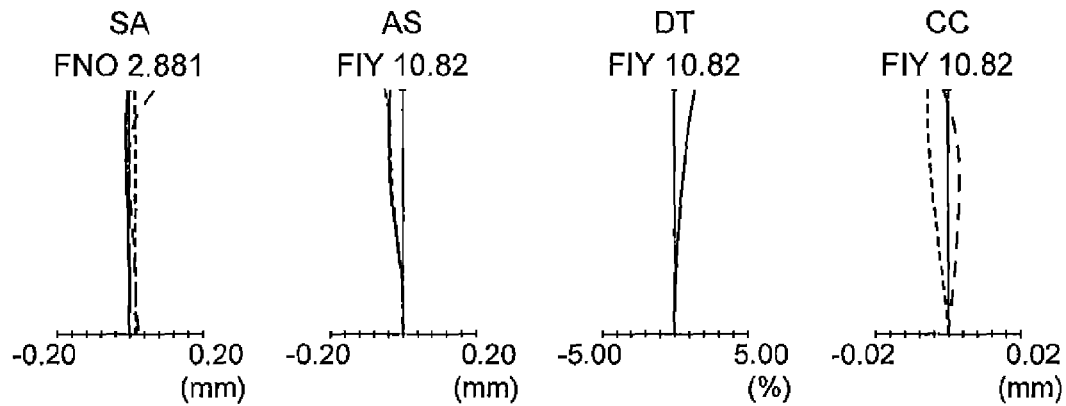

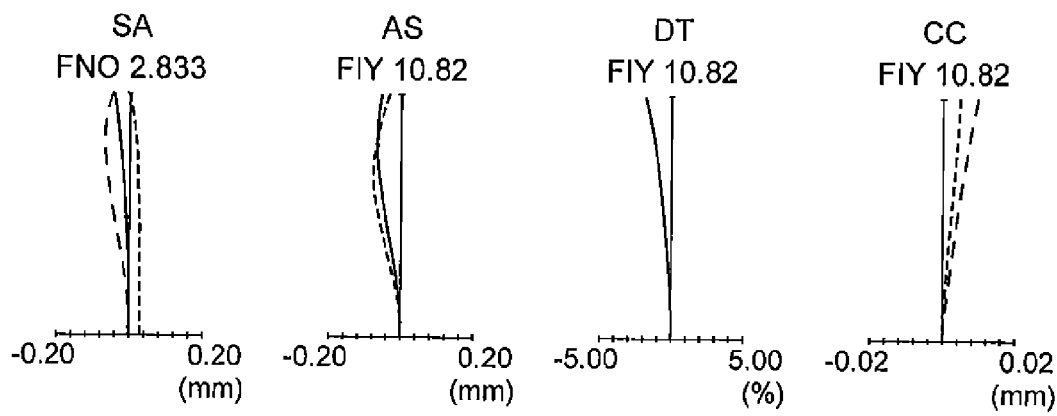
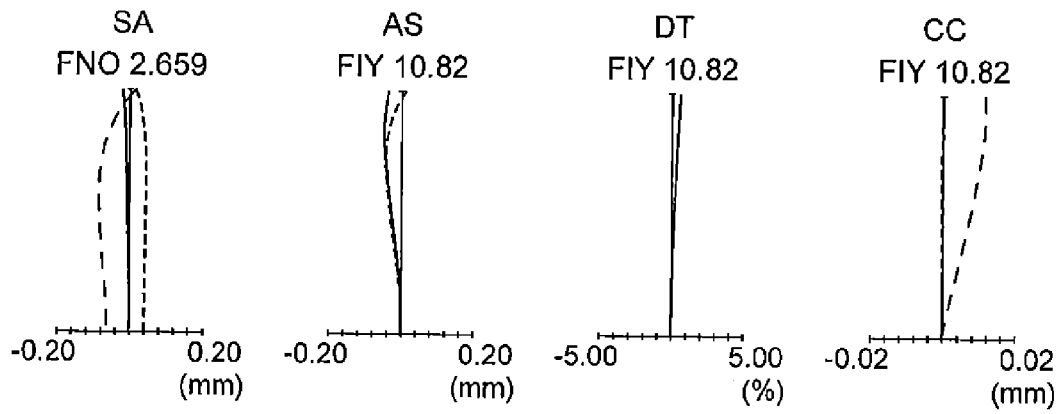
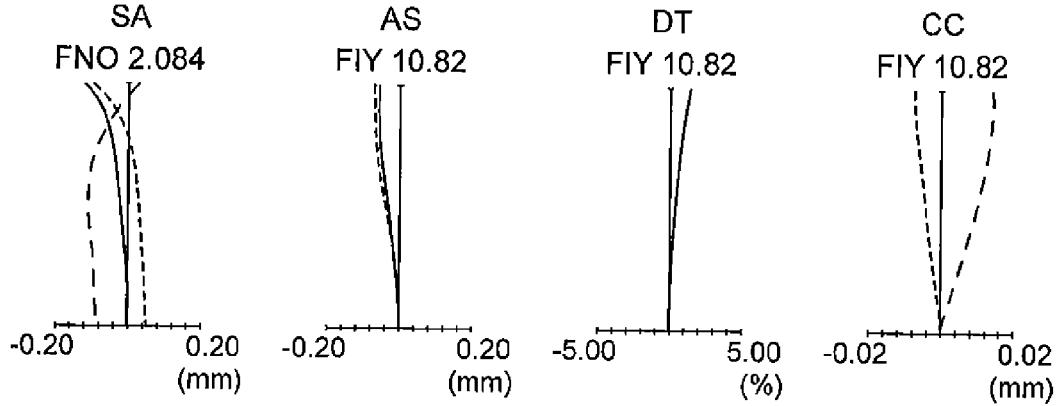

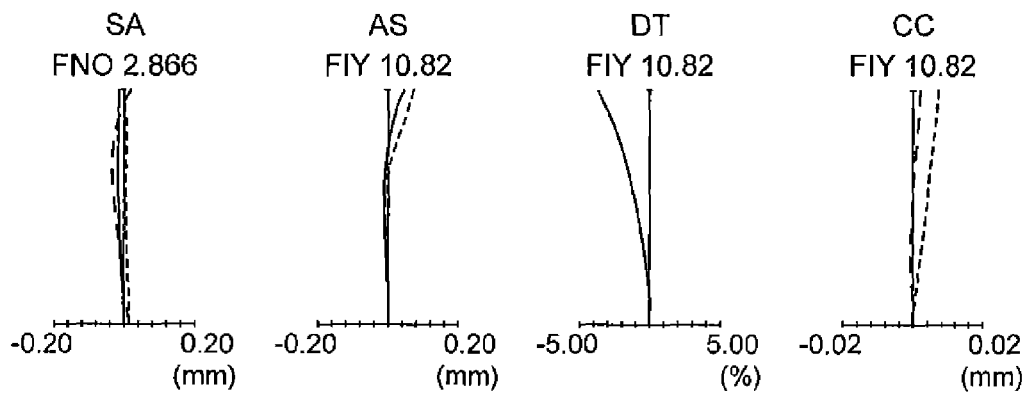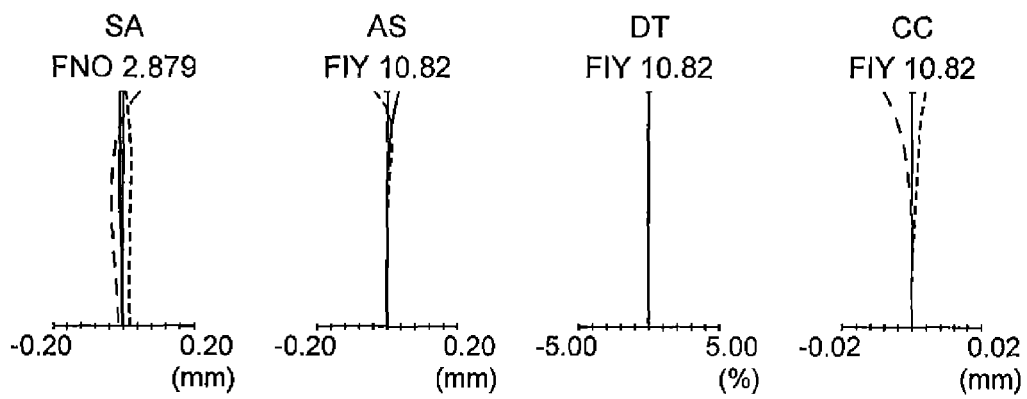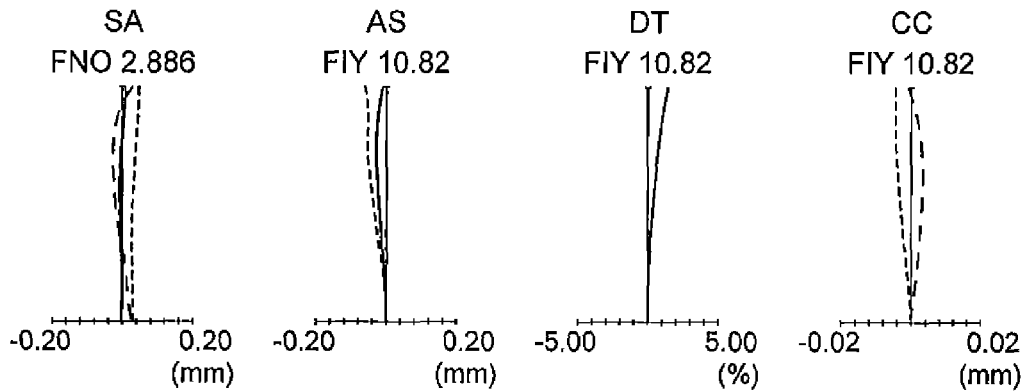

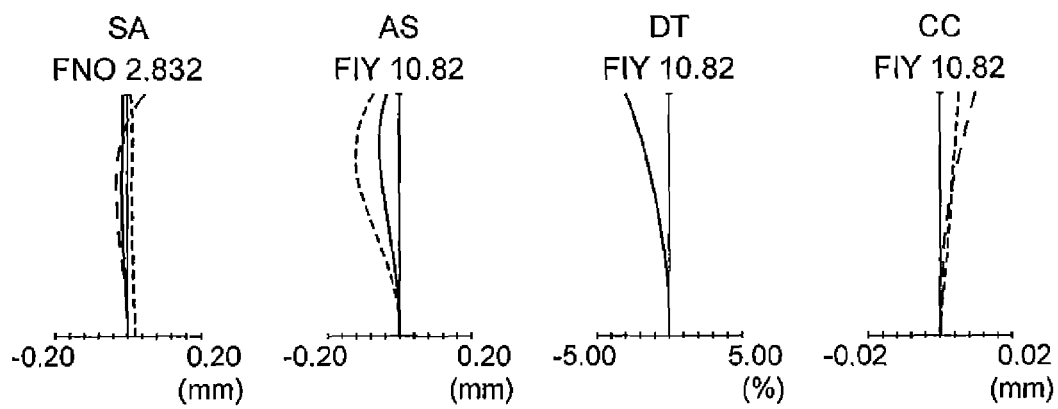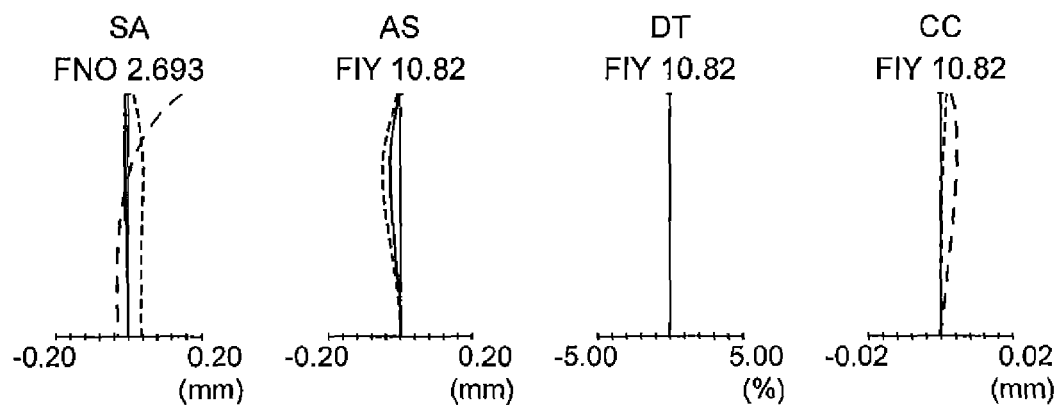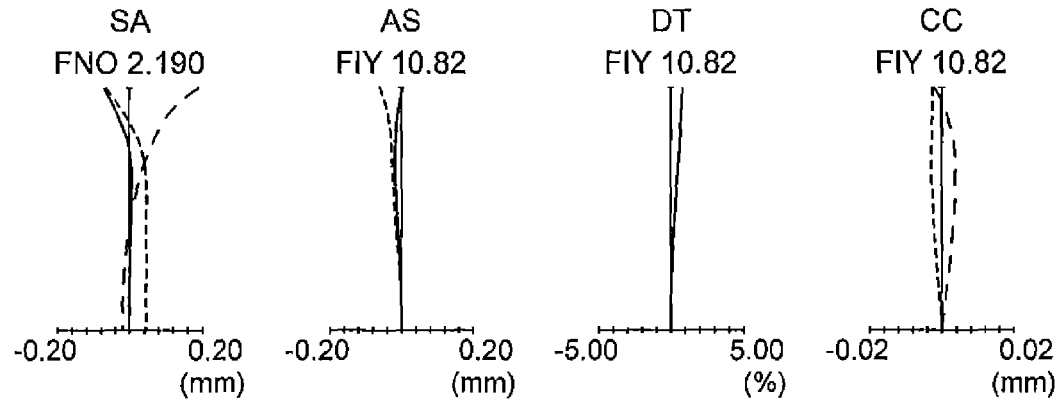

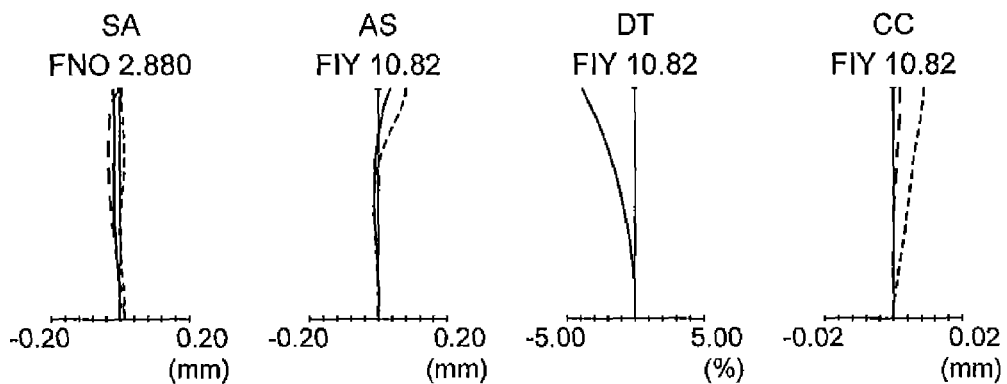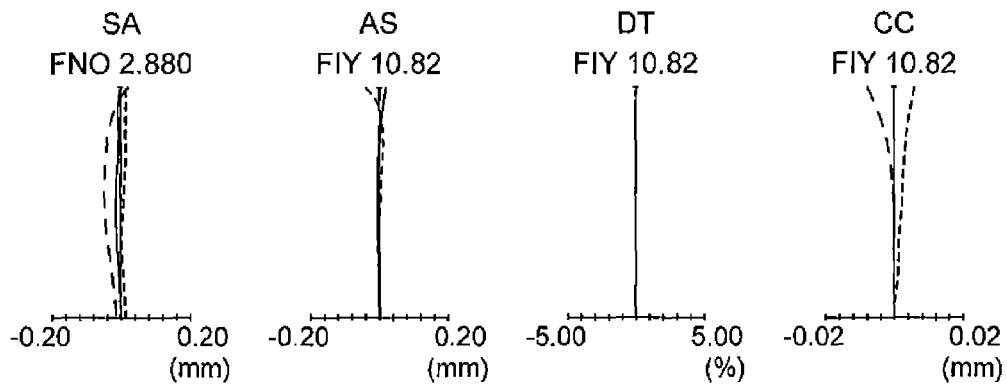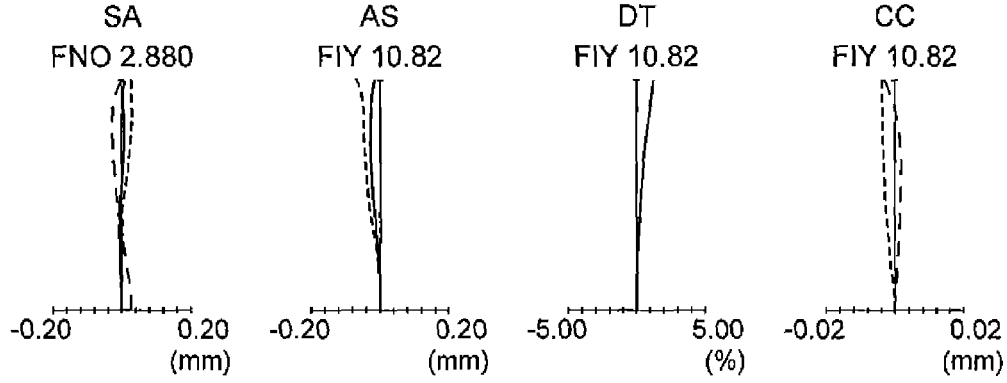

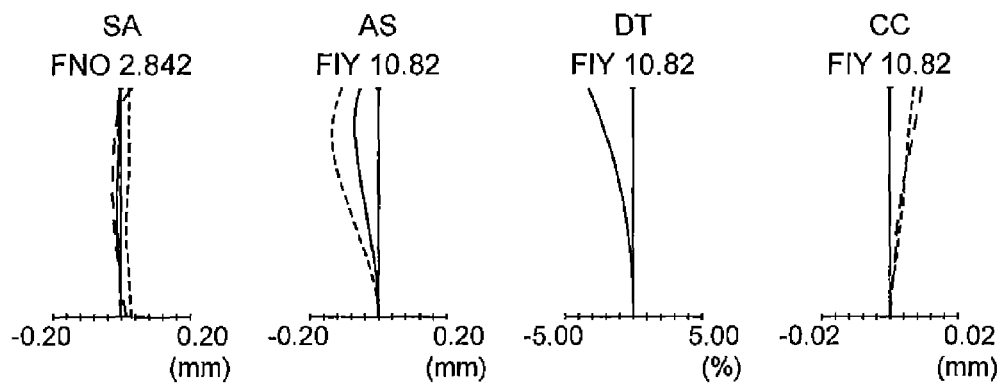
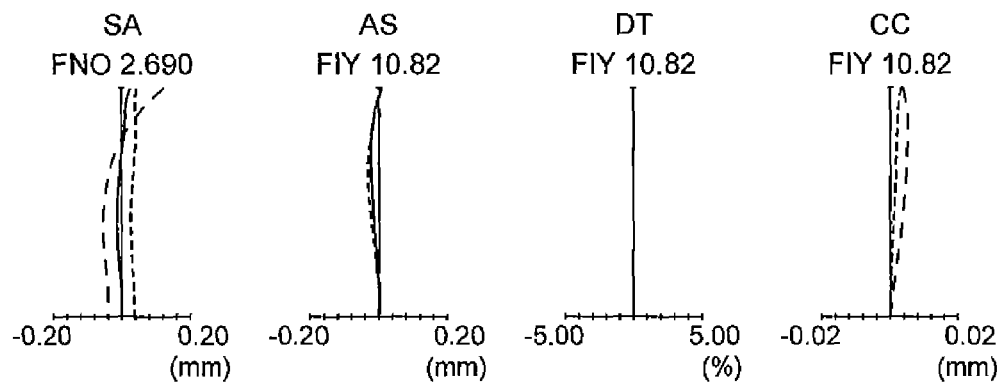
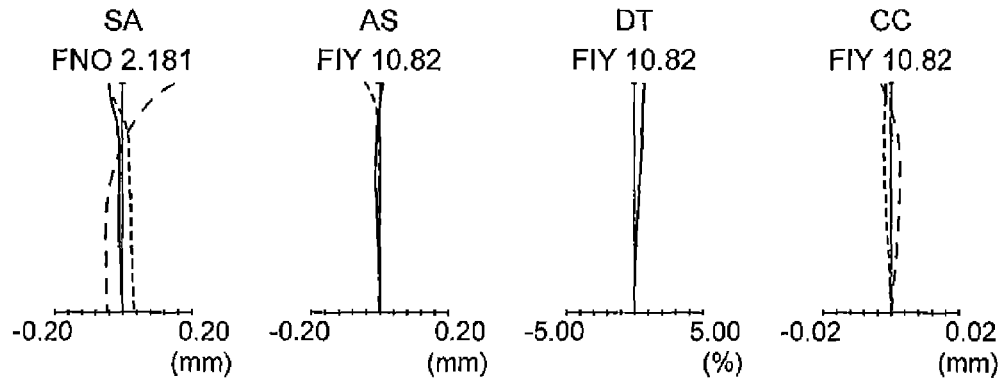

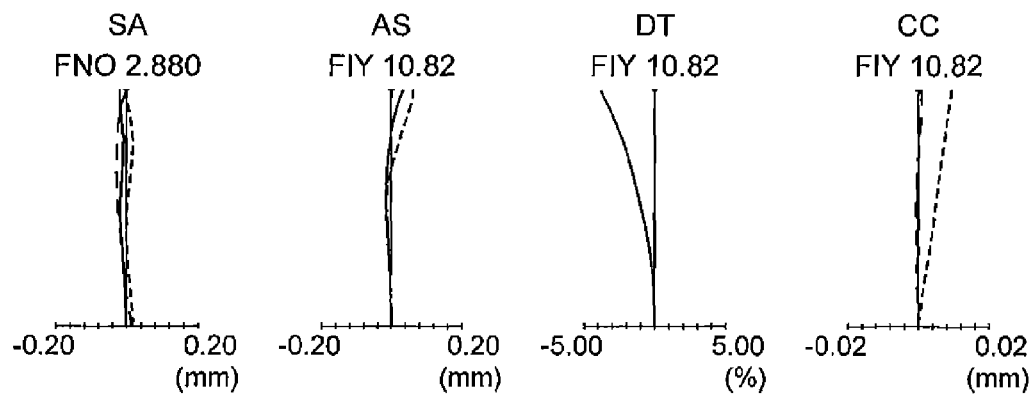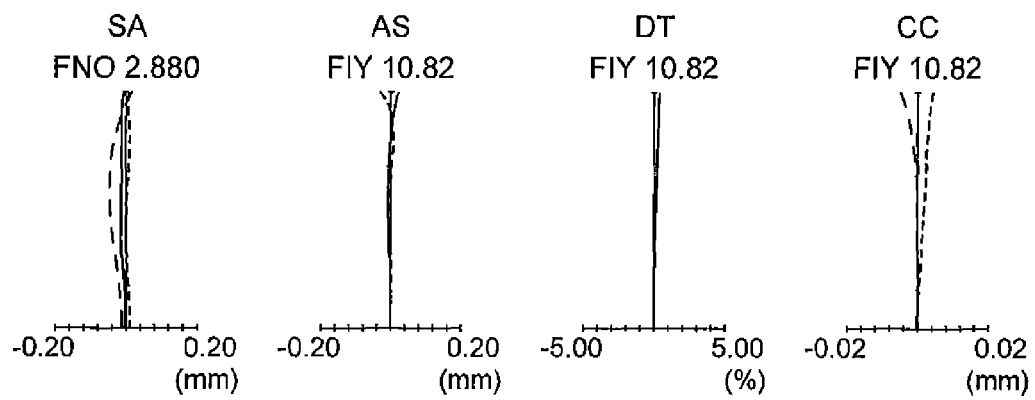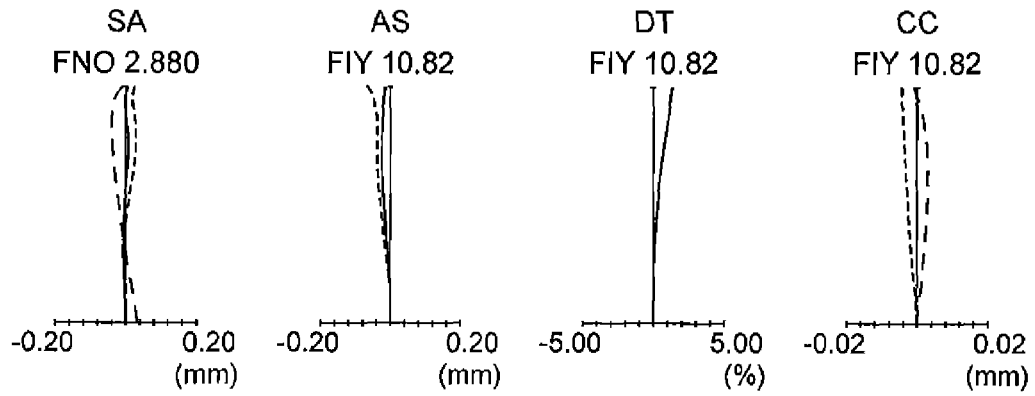

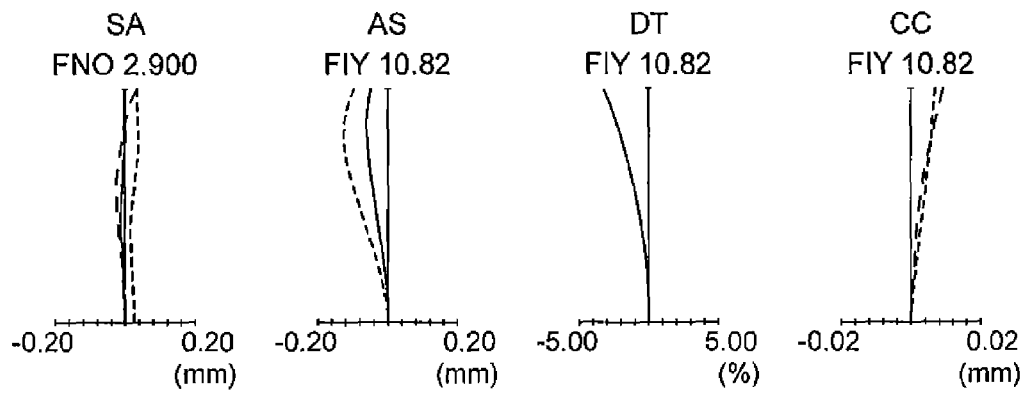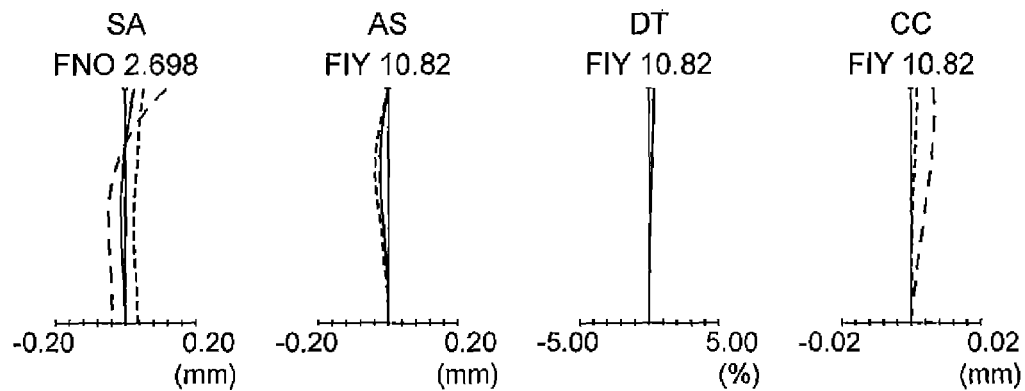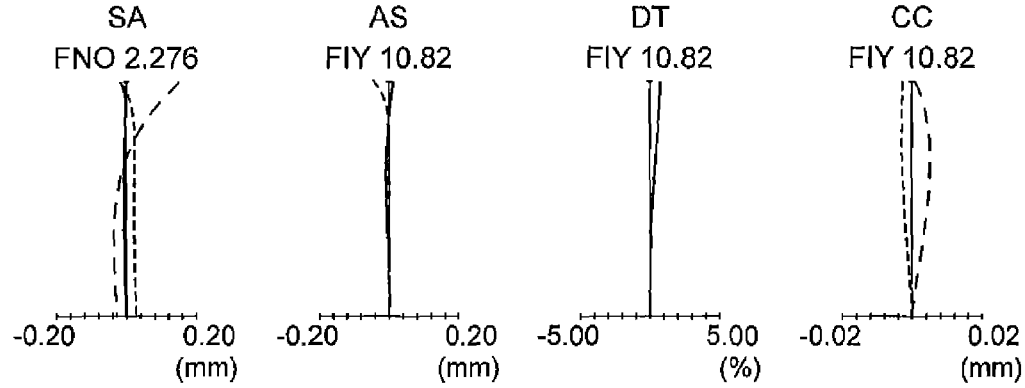

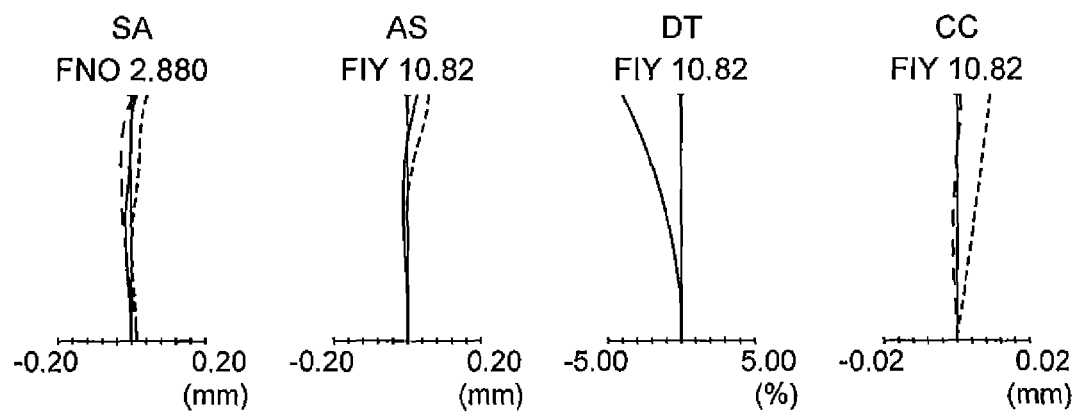
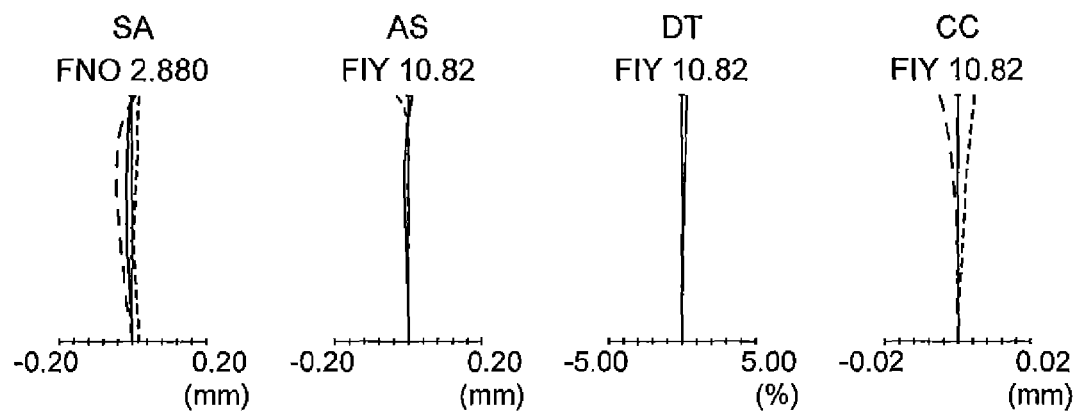
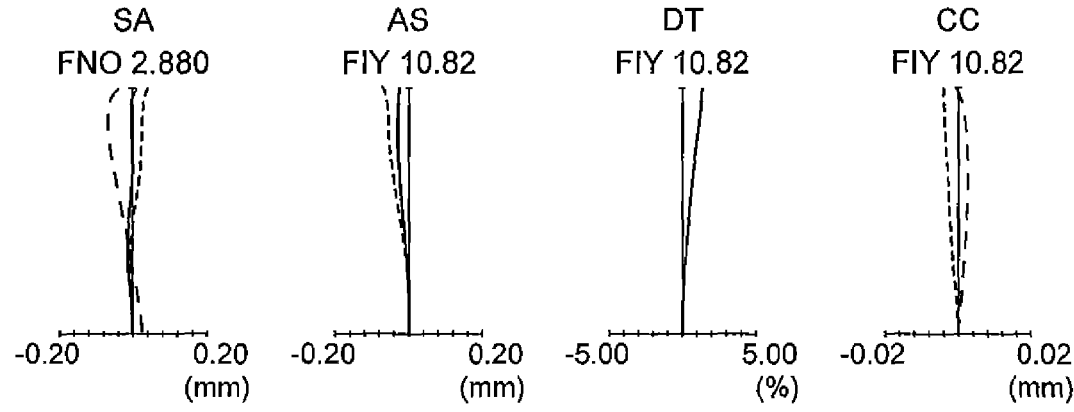

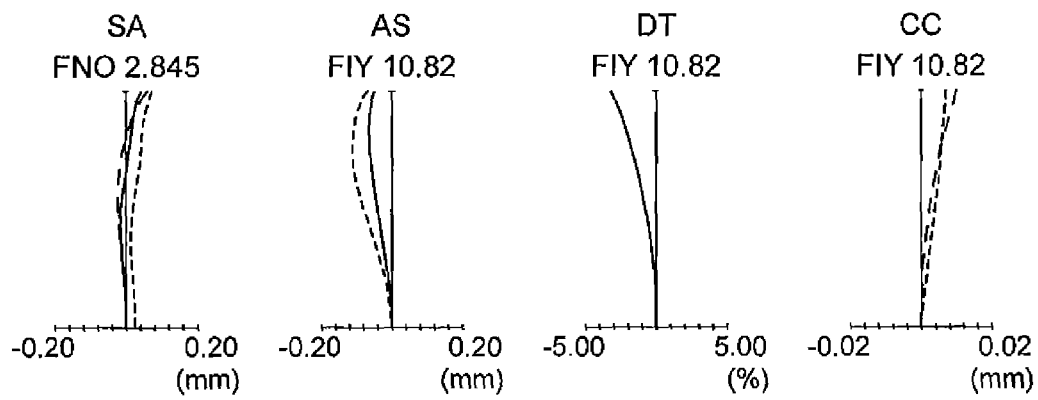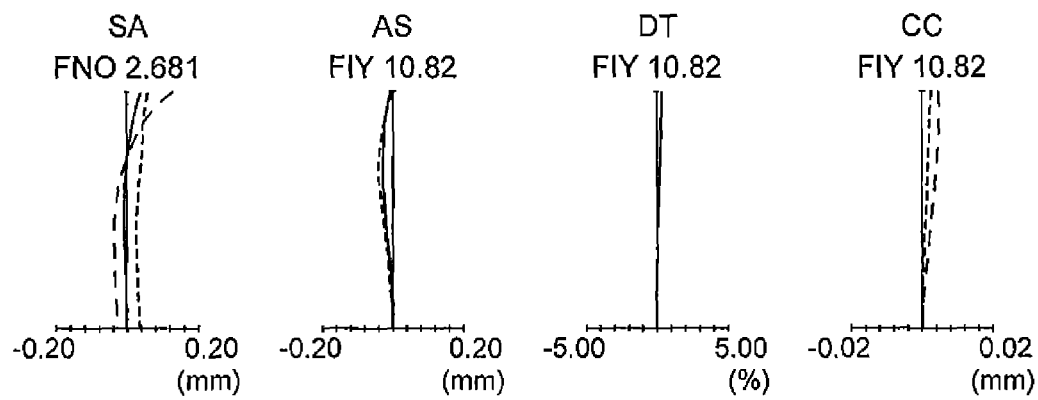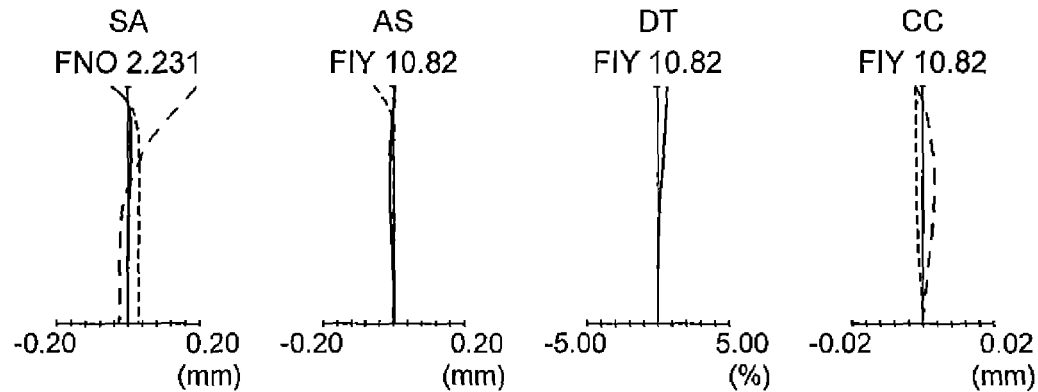

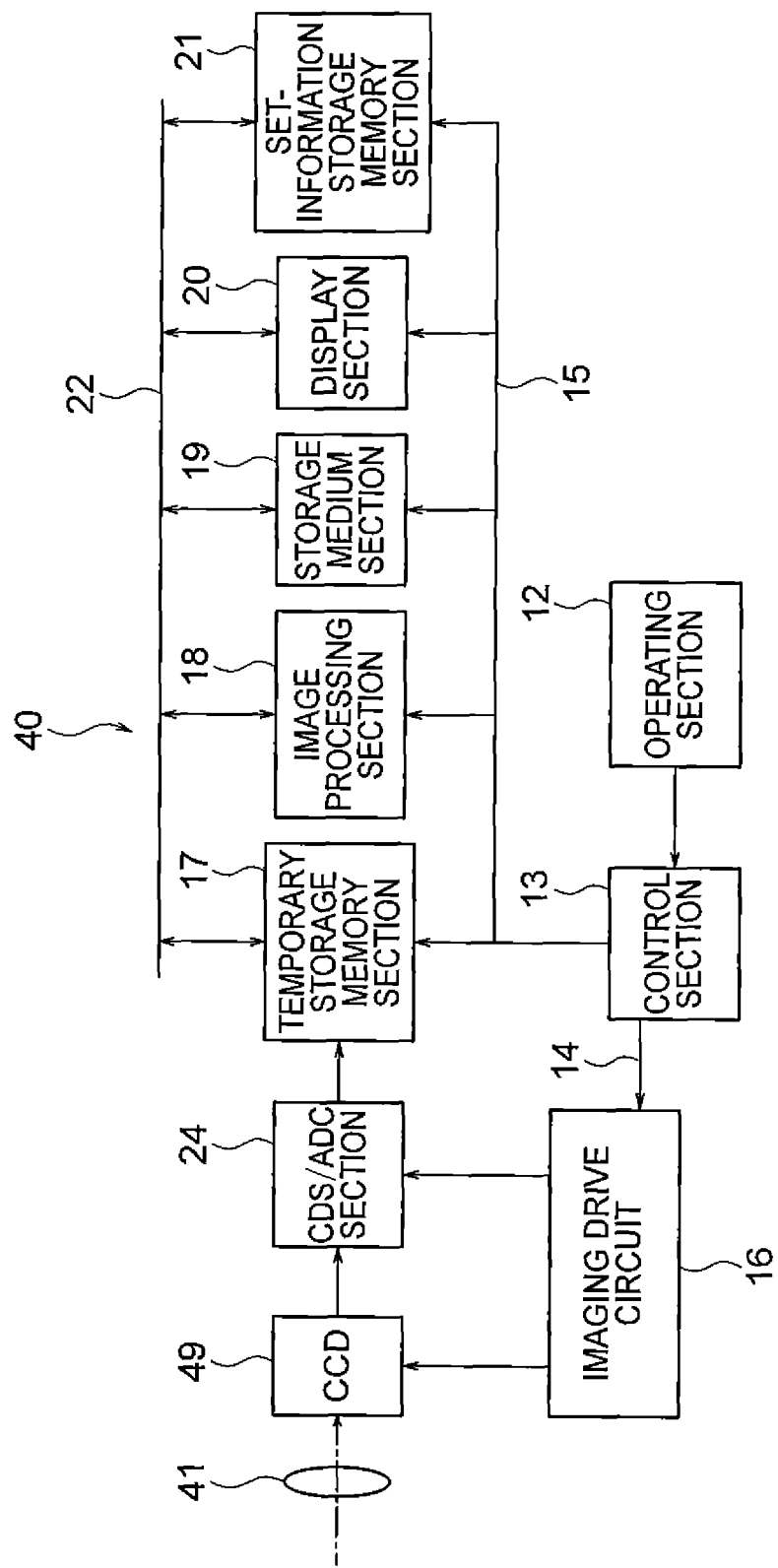

ZOOM LENS AND ZOOM LENS APPARATUS USING THE SAME

CROSS-REFERENCE TO RELATED APPLICATION

The present application is based upon and claims the benefit of priority from the prior Japanese Patent Application No. 2013-259561 filed on Dec. 16, 2013; the entire contents of which are incorporated herein by reference.

BACKGROUND OF THE INVENTION

1. Field of the Invention

The present invention relates to a zoom lens, and a zoom lens apparatus using the same.

2. Description of the Related Art

A zoom lens such as a zoom lens disclosed in Japanese Patent Application Laid-open Publication No. 2007-212830 and a zoom lens disclosed in Japanese Patent Application Laid-open Publication No. 2010-191336, has hitherto been proposed as a large-aperture telephoto zoom lens of class F2.8. The zoom lens in Japanese Patent Application Laid-open Publication No. 2007-212830 is a four-unit zoom lens having an arrangement of refractive power in order from an object side, a positive refractive power, a negative refractive power, a positive refractive power, and a positive refractive power. At the time of zooming, a second lens unit and a third lens unit move. Moreover, focusing is carried out by dividing a first lens unit into a front unit and a rear unit, and by moving the rear unit.

According to such an arrangement, in the zoom lens disclosed in Japanese Patent Application Laid-open Publication No. 2007-212830, by an interchangeable lens application, at the time of zooming, a focal length changes from 50 mm to 150 mm, and an F-number is about 2.8 in an overall zoom range.

Moreover, the zoom lens disclosed in Japanese Patent Application Laid-open Publication No. 2010-191336, is a five-unit zoom lens having an arrangement of refractive power in order from an object side, a positive refractive power, a negative refractive power, a positive refractive power, a negative refractive power, and a positive refractive power. In the zoom lens according to Japanese Patent Application Laid-open Publication No. 2010-191336, at the time of zooming, lens units from a second lens unit up to a fourth lens unit move. Moreover, at the time of focusing, the third lens unit is to be moved.

According to such an arrangement, in the zoom lens according to the Japanese Patent Application Laid-open Publication No. 2010-191336, by an interchangeable lens application, at the time of zooming, a focal length changes from 70 mm to 200 mm, and an F-number is about 2.8 in an overall zoom range.

In both the arrangements, the first lens unit is fixed and let to be static so that a balance of weight at the time of zooming is not disturbed. Moreover, for focusing, an inner focusing method is adopted. Focusing at an object at a close distance is carried out by the inner focusing. By devising such method, operability is improved. However, with regard to small-sizing of the zoom lens, it is insufficient.

On the other hand, in Japanese Patent Application Laid-open Publication No. 2012-47814, Japanese Patent No. 5068238, and Japanese Patent Application Laid-open Publication No. 2011-232624, small-sized telephoto zoom lenses have been disclosed. The zoom lens in Japanese Patent Application Laid-open Publication No. 2012-47814 is a six-unit zoom lens having an arrangement of refractive power in order from an object side, a positive refractive power, a negative refractive power, a positive refractive power, a negative refractive power, a negative refractive power, and a positive refractive power. In the zoom lens according to Japanese Patent Application Laid-open Publication No. 2012-47814, at the time of zooming, a second lens unit, a fourth lens unit, and a fifth lens unit move. Moreover, for focusing at an object at a close distance, the fourth lens unit and the fifth lens unit are moved independently.

According to such an arrangement, in the zoom lens disclosed in Japanese Patent Application Laid-open Publication No. 2012-47814, by an interchangeable lens application, at the time of zooming, a focal length changes from 45 mm up to 175 mm, and an F-number is in a range of 4~5.6 in a zoom range.

The zoom lens in Japanese Patent No. 5068238 is a five unit zoom lens having an arrangement of refractive power in order from an object side, a positive refractive power, a negative refractive power, a positive refractive power, a positive refractive power, and a negative refractive power. In the zoom lens according to Japanese Patent No. 5068238, at the time of zooming, a first lens unit, and lens units from a third lens unit to a fifth lens unit move.

According to such an arrangement, in the zoom lens disclosed in Japanese Patent No. 5068238, by an interchangeable lens application, at the time of zooming, a focal length changes from 80 mm to 400 mm, and an F-number is in a range of 4.5~5.6 in a zoom range.

Moreover, the zoom lens according to Japanese Patent Application Laid-open Publication No. 2011-232624 is a four unit zoom lens having an arrangement of refractive power in order from an object side, a positive refractive power, a negative refractive power, a positive refractive power, and a negative refractive power. In the zoom lens according to Japanese Patent Application Laid-open Publication No. 2011-232624, at the time of zooming, each lens unit moves.

According to such an arrangement, in the zoom lens according to Japanese Patent Application Laid-open Publication No. 2011-232624, by an interchangeable lens application, at the time of zooming, a focal length changes from 40 mm to 150 mm, and an F-number is in a range of 4~5.6 in a zoom range. Furthermore, in the zoom lens according to Japanese Patent Application Laid-open Publication No. 2011-232624, a resin material having a high abnormal dispersibility is used, thereby making a focusing lens unit light-weight, and facilitating correction of chromatic aberration.

However, in each of the zoom lenses according to Japanese Patent Application Laid-open Publication No. 2012-47814, Japanese Patent No. 5068238, and Japanese Patent Application Laid-open Publication No. 2011-232624, the F-number at a telephoto end is about 5.6 which is large, and is a dark lens.

Meanwhile, in Japanese Patent Publication No. 4560745 and Japanese Patent Publication No. 3466711, high-magnification zoom lenses for a compact camera have been disclosed. The zoom lens disclosed in Japanese Patent Publication No. 4560745 is a six-unit zoom lens having an arrangement of refractive power in order from an object side, a positive refractive power, a negative refractive power, a positive refractive power, a negative refractive power, a negative refractive power, and a positive refractive power. In the zoom lens disclosed Japanese Patent Publication No. 4560745, at the time of zooming, each lens unit moves.

According to such an arrangement, the zoom lens disclosed in Japanese Patent Publication No. 4560745 is a high-magnification zoom lens for which, at the time of zooming, a focal length changes (focal length is standardized) in a range of 1 mm-28 mm, and an F-number is in a range of about 1.8-3.6 in a zoom range.

The zoom lens disclosed in Japanese Patent Publication No. 3466711 is a five-unit zoom lens having an arrangement of refractive power in order from an object side, a positive refractive power, a negative refractive power, a positive refractive power, a negative refractive power, and a positive refractive power. In the zoom lens disclosed in Japanese Patent Publication No. 3466711, at the time of zooming, a second lens unit and a fourth lens unit move.

According to such an arrangement, the zoom lens disclosed in Japanese Patent Publication No. 3466711 is a high-magnification zoom lens for which, at the time of zooming, a focal length changes (focal length is normalized) in a range of 1 mm~20 mm, and an F-number is in a range of about 1.8~3.6 in a zoom range.

Here, it is not possible to use the zoom lenses disclosed in the aforementioned patent publications as they are, as an interchangeable lens.

SUMMARY OF THE INVENTION

A zoom lens according to a first aspect of the present invention includes in order from an object side to an image side, a first lens unit having a positive refractive power, a second lens unit having a negative refractive power, a third lens unit having a positive refractive power, and a fourth lens unit, and at a telephoto end, with respect to a wide angle end, a distance between the first lens unit and the second lens unit widens, and a distance between the second lens unit and the third lens unit narrows, and at the time of zooming from the wide angle end to the telephoto end, a distance between the third lens unit and the fourth lens unit changes, and the zoom lens satisfies the following conditional expressions (1) and (2).

$$1.1 < f_2/f_3 < 1.8 \quad (1)$$

$$-0.5 < \Delta G_1/\Delta G_2 < 0.5 \quad (2)$$

where, $f_2$ denotes a focal length of the second lens unit, $f_3$ denotes a focal length of the third lens unit, $\Delta G_1$ denotes a difference in a position of the first lens unit at the wide angle end and a position of the first lens unit at the telephoto end, $\Delta G_1$ is let to have a positive sign when the first lens unit is positioned on the object side at the telephoto end with respect to the wide angle end, and $\Delta G1$ is let to have a negative sign when the first lens unit is positioned on the image side at the telephoto end with respect to the wide angle end, and $\Delta G_2$ denotes an absolute value of the maximum amount of movement of the second lens unit at the time of zooming from the wide angle end to the telephoto end.

A zoom lens according to a second aspect of the present invention includes in order from an object side to an image side, a first lens unit having a positive refractive power, a second lens unit having a negative refractive power, a third lens unit having a positive refractive power, and a fourth lens unit, and at a telephoto end, with respect to a wide angle end, a distance between the first lens unit and the second lens unit widens, and a distance between the second lens unit and the third lens unit narrows, and at the time of zooming from the wide angle end to the telephoto end, a distance between the third lens unit and the fourth lens unit changes, and the zoom lens satisfies the following conditional expressions (1) and (3).

$$1.1 < f_2/f_3 < 1.8 \quad (1)$$

$$0.8 < \Delta G_2/f_3 < 2.8 \quad (3)$$

where, $f_2$ denotes a focal length of the second lens unit, $f_3$ denotes a focal length of the third lens unit, and $\Delta G_2$ denotes an absolute value of the maximum amount of movement of the second lens unit at the time of zooming from the wide angle end to the telephoto end.

A zoom lens according to a third aspect of the present invention includes in order from an object side to an image side, a first lens unit having a positive refractive power, a second lens unit having a negative refractive power, a third lens unit having a positive refractive power, and a fourth lens unit, and at a telephoto end, with respect to a wide angle end, a distance between the first lens unit and the second lens unit widens, and a distance between the second lens unit and the third lens unit narrows, and at the time of zooming from the wide angle end to the telephoto end, the first lens unit is stationary, and a distance between the third lens unit and the fourth lens unit changes, and the zoom lens satisfies the following conditional expression (1).

$$1.1 < f_2/f_3 < 1.8 \quad (1)$$

where, $f_2$ denotes a focal length of the second lens unit, and $f_3$ denotes a focal length of the third lens unit.

A zoom lens according to a fourth aspect of the present invention includes in order from an object side to an image side, a first lens unit having a positive refractive power, a second lens unit having a negative refractive power, a third lens unit having a positive refractive power, and a fourth lens unit having a negative refractive power, and at a telephoto end, with respect to a wide angle end, a distance between the first lens unit and the second lens unit widens, and a distance between the second lens unit and the third lens unit narrows, and at the time of zooming from the wide angle end to the telephoto end, a distance between the third lens unit and the fourth lens unit changes, and the second lens unit includes a positive lens which is a lens disposed nearest to the object, in the second lens unit.

A zoom lens according to a fifth aspect of the present invention includes in order from an object side to an image side, a first lens unit having a positive refractive power, a second lens unit having a negative refractive power, a third lens unit having a positive refractive power, a fourth lens unit having a negative refractive power, a fifth lens unit having a negative refractive power, and a sixth lens unit having a positive refractive power, and at a telephoto end, with respect to a wide angle end, a distance between the first lens unit and the second lens unit widens, and a distance between the second lens unit and the third lens unit narrows, and at the time of zooming from the wide angle end to the telephoto end, a distance between the third lens unit and the fourth lens unit changes, a distance between the fourth lens unit and the fifth lens unit changes, and a distance between the fifth lens unit and the sixth lens unit changes, and the zoom lens satisfies the following conditional expression (1).

$$1.1 < f_2/f_3 < 1.8 \quad (1)$$

where, $f_2$ denotes a focal length of the second lens unit, and $f_3$ denotes a focal length of the third lens unit.

A zoom lens apparatus according to the present invention includes the abovementioned zoom lens, and a mount portion which enables to connect the zoom lens to a camera main-body.

BRIEF DESCRIPTION OF THE DRAWINGS

FIG. 1A is a lens cross-sectional view at a wide angle end, FIG. 1B is a lens cross-sectional view in an intermediate focal length state, and FIG. 1C is a lens cross-sectional view at a telephoto end;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of focusing at infinite distance by the zoom lens according to the example 1;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of focusing at a close distance by the zoom lens according to the example 1, where, a distance between an object and an image is 0.7 m;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of focusing at infinite distance by the zoom lens according to the example 2;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of focusing at a close distance by the zoom lens according to the example 2, where, a distance between an object and an image is 0.7 m;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of focusing at infinite distance by the zoom lens according to the example 3;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of focusing at a close distance by the zoom lens according to the example 3, where, a distance between an object and an image is 0.7 m;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of focusing at infinite distance by the zoom lens according to the example 4;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of focusing at a close distance by the zoom lens according to the example 4, where, a distance between an object and an image is 0.7 m;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams at the time of focusing at infinite distance by the zoom lens according to the example 5;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of focusing at a close distance by the zoom lens according to the example 5, where, a distance between an object and an image is 0.7 m;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams at the time of focusing at infinite distance by the zoom lens according to the example 6;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of focusing at a close distance by the zoom lens according to the example 6, where, a distance between an object and an image is 0.7 m;

FIG. 22 is a schematic block diagram of an internal circuit of main components of the interchangeable lens camera.

DETAILED DESCRIPTION OF THE INVENTION

Figure 1A:
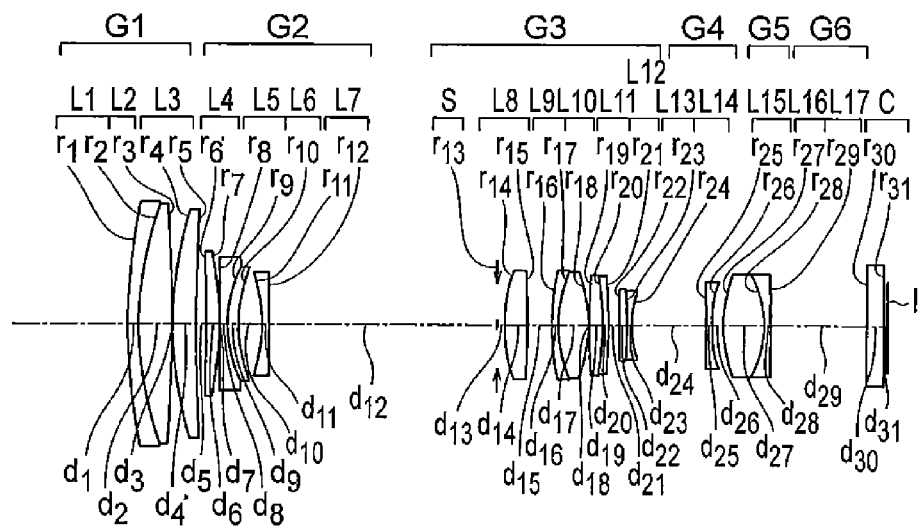
FIG. 1A, FIG. 1B, and FIG. 1C are lens cross-sectional views at the time of infinite object point focusing of a zoom lens according to an example 1 of the present invention, where.

A zoom lens according to a first embodiment of the present invention, includes in order from an object side to an image side, a first lens unit having a positive refractive power, a second lens unit having a negative refractive power, a third lens unit having a positive refractive power, and a fourth lens unit, and at a telephoto end with respect to a wide angle end, a distance between the first lens unit and the second lens unit widens, and a distance between the second lens unit and the third lens unit narrows, and at the time of zooming from the wide angle end to the telephoto end, a distance between the third lens unit and the fourth lens unit changes, and the zoom lens satisfies the following conditional expressions (1) and (2).

$$1.1 < f_2/f_3 < 1.8 \quad (1)$$

$$-0.5 < \Delta G_1/\Delta G_2 < 0.5 \quad (2)$$

where, $f_2$ denotes a focal length of the second lens unit, $f_3$ denotes a focal length of the third lens unit, $\Delta G_1$ denotes a difference in a position of the first lens unit at the wide angle end and a position of the first lens unit at the telephoto end, $\Delta G_1$ is let to have a positive sign when the first lens unit is positioned on the object side at the telephoto end with respect to the wide angle end, and $\Delta G1$ is let to have a negative sign when the first lens unit is positioned on the image side at the telephoto end with respect to the wide angle end, and $\Delta G_2$ denotes an absolute value of the maximum amount of movement of the second lens unit at the time of zooming from the wide angle end to the telephoto end.

As described in a conventional example, in a large-aperture telephoto zoom lens which is typified by an arrangement of refractive power in order from an object side, a positive refractive power, a negative refractive power, a positive refractive power, and a positive refractive power, a light beam converged in a first lens unit is incident on a second lens unit. Next, a light beam diverged largely in the second lens unit is incident on a third lens unit. Moreover, the light beam is converged gently while passing through the third lens unit and a fourth lens unit, and reaches an image plane.

Consequently, lens units from the third lens unit onward have a lens diameter of about same dimension. Therefore, if members such as a lens-frame member for supporting a lens, a cam member for driving, or a motor for driving a diaphragm, or a motor for lens drive are disposed, a lens-frame diameter at an intermediate portion of the zoom lens becomes large.

Particularly, when it is a telephoto zoom lens of an F-number of about 2.8, the lens-frame diameter of the intermediate portion tends to be larger than the first lens unit which has a large diameter.

Therefore, in the present embodiment, by the zoom lens including the first lens unit having a positive refractive power, the second lens unit having a negative refractive power, the third lens unit having a positive refractive power, and the fourth lens unit, and by setting the positive refractive power of the third lens unit to be comparatively larger, a lens diameter of the subsequent fourth lens unit onward is made small. As a result of this, a space for disposing various members is secured, and a small-sizing of the lens-frame diameter is achieved.

On the other hand, in the large-aperture telephoto zoom lens, a lens diameter of the first lens unit is extremely large, and therefore, a weight of lenses in the first lens unit is also large. For instance, if the first lens unit is movable while zooming, a position of the center of gravity as a whole, changes with the movement of the first lens unit. Accordingly, an operability is degraded. For solving such problem, it is desirable to let the first lens unit to be fixed, or to let an amount of movement of the first lens unit to be small.

In this case, most of the zooming effect is borne by the second lens unit. Therefore, for small-sizing of the overall length of lenses related to the amount of movement of the second lens unit, and for suppressing aberration fluctuation due to zooming, an appropriate arrangement of refractive power becomes necessary.

Conditional expression (1) regulates a proportion of the focal length of the second lens unit and the focal length of the third lens unit.

When exceeding an upper limit value of conditional expression (1), the focal length of the second lens unit becomes long. Accordingly, the amount of movement of the second lens unit for securing a zooming ratio becomes large, and the overall length of the lenses is worsened, or in other words, the overall length of the zoom lens becomes long.

When exceeding the upper limit value of conditional expression (1), and the focal length of the third lens unit becomes short, correction of aberration occurring in the third lens unit becomes difficult.

When falling below a lower limit value of conditional expression (1), and the focal length of the second lens unit becomes short, it is advantageous for small-sizing but, correction of aberration occurring in the second lens unit becomes difficult.

Moreover, when falling below the lower limit value of conditional expression (1), and the focal length of the third lens unit becomes long, small-sizing of the lens diameter of the fourth lens unit onward becomes difficult.

Next, the following conditional expression (2) will be described below.

$$-0.5 < \Delta G_1/\Delta G_2 < 0.5 \quad (2)$$

where, $\Delta G_1$ denotes a difference in a position of the first lens unit at the wide angle end and a position of the first lens unit at the telephoto end, and is an amount of zoom movement (amount of movement at the time of zooming) of the first lens unit. The movement toward the object side is let to have a positive (+) value.

$\Delta G_2$ denotes an amount of zoom movement of the second lens unit, and is an absolute value of the maximum amount of movement comparing the wide angle end, an intermediate focal length state, and the telephoto end, of the second lens unit.

Conditional expression (2) is an expression regulating a condition related to the amount of movement of the first lens unit and the amount of movement of the second lens unit. As mentioned above, for making operability of the user favorable, the amount of zoom movement of the first lens unit has been made small.

Whereas, for securing the zooming ratio, it is denoted that the zoom movement of the second lens unit which mainly assumes the role of zooming, is to be made large.

When exceeding an upper limit value of conditional expression (2) and the amount of movement of the first lens unit is made large, a movement of the center of gravity due to the zooming operation becomes large, and it is not preferable. Or, when exceeding the upper limit value of conditional expression (2), and the amount of movement of the second lens unit becomes small, since the refractive power of the second lens unit becomes large, correction of aberration becomes difficult.

When falling below a lower limit value of conditional expression (2) and the first lens unit moves toward the image side, not only that the movement of the center of gravity becomes large but also, there is an effect of decrease in magnification with respect to the zooming effect of the second lens unit, and therefore it is not preferable.

A zoom lens according to a second embodiment of the present invention includes in order from an object side to an image side, a first lens unit having a positive refractive power, a second lens unit having a negative refractive power, a third lens unit having a positive refractive power, and a fourth lens unit, and at a telephoto end with respect to a wide angle end, a distance between the first lens unit and the second lens unit widens, a distance between the second lens unit and the third lens unit narrows, and at the time of zooming from the wide angle end to the telephoto end, a distance between the third lens unit and the fourth lens unit changes, and the zoom lens satisfies the following conditional expressions (1) and (3).

$$1.1 < f_2/f_3 < 1.8 \quad (1)$$

$$0.8 < \Delta G_2/f_3 < 2.8 \quad (3)$$

where, $f_2$ denotes a focal length of the second lens unit, $f_3$ denotes a focal length of the third lens unit, and ΔG₂ denotes an absolute value of the maximum amount of movement of the second lens unit at the time of zooming from the wide angle end to the telephoto end.

Since a basic arrangement of the present embodiment is same as the basic arrangement of the first embodiment, repetitive description of the basic arrangement is omitted. In the following description, the arrangement as well as the action and effect already explained similarly will be omitted.

In the present embodiment, the zoom lens satisfies conditional expression (3).

Conditional expression (3) regulates a proportion of the amount of zoom movement of the second lens unit and the focal length of the third lens unit. Conditional expression (3) is an expression related to the amount of zoom movement of the second lens unit which is necessary for realizing both, the small-sizing of the zoom lens and aberration correction, and related to the focal length of the third lens unit for realizing small-sizing of the fourth lens unit onward.

If an upper limit value of conditional expression (3) is surpassed and the amount of movement of the second lens unit becomes large, it is contrary to making the overall length small. Or, if the upper limit value of conditional expression (3) is surpassed and the focal length of the third lens unit becomes small, it becomes difficult to correct aberration.

When falling below a lower limit value of conditional expression (3) and the amount of movement of the second lens unit becomes small, it is advantageous for making the overall length small. In this case, the refractive power of the second lens unit becomes large, and the correction of aberration becomes difficult. Or, if the value falls below the lower limit value of conditional expression (3) and the focal length of the third lens unit becomes long, small-sizing of the fourth lens unit onward becomes difficult.

A zoom lens according to a third embodiment of the present invention includes in order from an object side to an image side, a first lens unit having a positive refractive power, a second lens unit having a negative refractive power, a third lens unit having a positive refractive power, and a fourth lens unit, and at a telephoto end with respect to a wide angle end, a distance between the first lens unit and the second lens unit widens, and a distance between the second lens unit and the third lens unit narrows, and at the time of zooming from the wide angle end to the telephoto end, the first lens unit is stationary, and a distance between the third lens unit and the fourth lens unit changes, and the zoom lens satisfies the following conditional expression (1).

$$1.1 < f_2/f_3 < 1.8 \qquad (1)$$

where, $f_2$ denotes a focal length of the second lens unit, and
$f_3$ denotes a focal length of the third lens unit.

By the first lens unit being stationary at the time of zooming from the wide angle end to the telephoto end, it is advantageous for reducing of dust etc. entering into the lens system, suppressing sound leakage at the time of moving a lens unit, and reducing fluctuation in a balance of weight due to the zooming of the lens system.

Moreover, a zoom lens according to a fourth embodiment of the present invention includes in order from an object side to an image side, a first lens unit having a positive refractive power, a second lens unit having a negative refractive power, a third lens unit having a positive refractive power, and a fourth lens unit having a negative refractive power, and at a telephoto end with respect to a wide angle end, a distance between the first lens unit and the second lens unit widens, and a distance between the second lens unit and the third lens unit narrows, and at the time of zooming from the wide angle end to the telephoto end, and a distance between the third lens unit and the fourth lens unit changes, and the second lens unit includes a positive lens which is a lens disposed nearest to the object in the second lens unit.

In such manner, by arranging the first lens unit having a positive refractive power, the second lens unit having a negative refractive power, the third lens unit having a positive refractive power, and the fourth lens unit having a negative refractive power, and by changing mutual distances between the lens units, the overall length is shortened and the zooming ratio is secured.

Since the positive lens is disposed on the object side of the second lens unit, nearest to the object, an incident light ray is subjected to a large divergence effect at a position in the second lens unit nearest to the image. Therefore, a height of a light ray incident on the third lens unit becomes comparatively smaller, and in combination with the arrangement of the positive refractive power of the third lens unit, it is possible to make small the lens diameter of the fourth lens unit onward.

Moreover, according to a preferable aspect of the present invention, it is desirable that the fourth lens unit has a negative refractive power.

In such manner, by arranging the first lens unit having a positive refractive power, the second lens unit having a negative refractive power, the third lens unit having a positive refractive power, and the fourth lens unit having a negative refractive power, and by changing the mutual distances between the lens units, the overall length is shortened and the zooming ratio is secured.

Moreover, according to a preferable aspect of the present invention, a zoom lens includes in order from an object side to an image side, a first lens unit having a positive refractive power, a second lens unit having a negative refractive power, a third lens unit having a positive refractive power, a fourth lens unit having a negative refractive power, a fifth lens unit having a negative refractive power, and a sixth lens unit having a positive refractive power, and at a telephoto end with respect to a wide angle end, a distance between the first lens unit and the second lens unit widens, and a distance between the second lens unit and the third lens unit narrows, and at the time of zooming from the wide angle end to the telephoto end, a distance between the third lens unit and the fourth lens unit changes, and a distance between the fourth lens unit and the fifth lens unit changes, and a distance between the fifth lens unit and the sixth lens unit changes, and the zoom lens satisfies the following conditional expression (1).

$$1.1 < f_2/f_3 < 1.8 \qquad (1)$$

where, $f_2$ denotes a focal length of the second lens unit, and
$f_3$ denotes a focal length of the third lens unit.

The sixth lens unit has a positive refractive power and has an effect of drawing apart an exit pupil from an image plane. A reduction of shading by oblique incidence characteristics of an image pickup element is carried out.

The fifth lens unit is disposed between the fourth lens unit and the sixth lens unit. The fifth lens unit suppresses an aberration fluctuation caused due to zooming.

Moreover, according to a preferable aspect of the present invention, it is desirable that at the time of zooming from the wide angle end to the telephoto end, the third lens unit is stationary.

Accordingly, since it is possible to eliminate a need of a mechanism for moving the third lens unit for zooming, it is advantageous for making it a cost low. For small-sizing of the overall zoom lens, it is preferable to enhance the positive refractive power of the third lens unit. In this case, it is preferable to reduce aberration by securing the number of lenses in the third lens unit. On the other hand, for reducing aberration and securing sufficient brightness, the third lens unit is susceptible to become large and heavy.

By letting the third lens unit to be stationary, it is possible to simplify a mechanism for zooming, and to reduce a load on the mechanism.

Moreover, according to a preferable aspect of the present invention, it is desirable that the zoom lens includes a lens unit nearest to the image side having a positive refractive power, which is disposed on the image side of the fourth lens unit, and which is stationary at the time of zooming from the wide angle end to the telephoto end.

By this arrangement, dust etc. entering into the zoom lens system is reduced, and a leakage of sound when a lens is driven is reduced.

Moreover, according to a preferable aspect of the present invention, it is desirable that the fourth lens unit is a focusing lens unit which moves at the time of focusing from an infinite object point to an object point at a close distance.

The fourth lens unit is a lens unit in which, it is easy to make a dimension in a radial direction small. The fourth lens unit is let to be the focusing lens unit. Accordingly, a drive load (load such as an electrical power load) at the time of focusing is reduced.

Moreover, according to a preferable aspect of the present invention, it is desirable that the fourth lens unit and the fifth lens unit move by a different amount of movement at the time of focusing from an infinite object point to an object point at a close distance.

The fourth lens unit and the fifth lens unit are lens units in which, it is easy to make the dimension in the radial direction small. The fourth lens unit and the fifth lens unit are let to be the focusing lens units. Accordingly, the drive load (load such as the electrical power load) at the time of focusing is reduced. Moreover, in a case of letting the plurality of lens units to be lens units to be moved at the time of focusing, it is possible to carry out reduction of aberration at the time of focusing at both of a distant object and a close object, and shortening of the shortest photographing distance.

It is preferable that the first lens unit includes in order from the object side to the image side, a cemented lens of a negative meniscus lens and a biconvex positive lens, and a positive meniscus lens having a convex surface directed toward the object side.

In a case of a telephoto lens, an effect of a longitudinal chromatic aberration on an image quality is extremely large.

Here, an aberration occurred in the first lens unit contributes to enhancing an aberration at an image plane by a magnification of the second lens unit onward. Consequently, it is necessary to correct sufficiently the longitudinal chromatic aberration which basically occurs in the first lens unit. For this, it is desirable that the zoom lens satisfies conditional expression (4).

$$70 < v_{1p} < 100 \quad (4)$$

where, $v_{1p}$ denotes an average value of Abbe's number for a d-line of the positive lenses in the first lens unit.

When exceeding an upper limit value of conditional expression (4), it is not a practical glass material. When falling below a lower limit value of conditional expression (4), the longitudinal chromatic aberration occurred in the first lens unit is large, and it is not possible to maintain a satisfactory image quality.

Moreover, according to a preferable aspect of the present invention, it is desirable that the second lens unit includes in order from the object side to the image side, a positive lens, a cemented negative lens, and a negative lens, and in the cemented negative lens, a biconcave negative lens and the positive meniscus lens are cemented.

Generally, in a zoom lens of a type including a first lens unit having a positive refractive power, a light beam which is converged in the first lens unit is diverged in a second lens unit having a negative refractive power, and after being converged once again in a third lens unit having a positive refractive power, the light beam is guided to a subsequent lens unit.

At this time, as it has hitherto been known, in a lens arrangement in which, a negative lens is disposed on the object side of the second lens unit nearest to the object, after the light beam from the first lens unit is incident on the second lens unit, the light beam is subjected to a divergence effect immediate at a position at which a light-ray height is high. Therefore, the light-ray height of the third lens unit onward becomes large, and it becomes difficult to make a lens diameter small.

On the other hand, in the lens arrangement of the present embodiment, since the positive lens is disposed on the object side of the second lens unit, nearest to the object, an incident light ray is subjected to a large divergence effect at a position in the second lens unit, nearest to the image. Therefore, a height of a light ray incident on the third lens unit becomes comparatively smaller, and in combination with the arrangement of the positive refractive power of the third lens unit, it is possible to make small the lens diameter of the fourth lens unit onward.

Moreover, since the second lens unit contributes substantially to the zooming effect, the aberration fluctuation due to zooming is susceptible to occur. Particularly, the contribution of the positive lens on the object side of the second lens unit nearest to the object side, to various aberrations is large, and an astigmatism, a distortion, and a chromatic aberration of magnification occur at the wide angle end. Moreover, in addition to these aberrations, a spherical aberration, a coma, and a longitudinal chromatic aberration occur at the telephoto end. Therefore, in order to correct the aberrations in the overall system in a balanced manner, it is desirable that the second lens unit satisfies the following conditional expressions (5) and (6).

$$0.9 < (r_1 + r_2)/(r_1 - r_2) < 2.2 \quad (5)$$

$$18 < v_{2p} < 28 \quad (6)$$

where, $r_1$ denotes a radius of curvature of a surface on the object side of the positive lens disposed nearest to the object in the second lens unit, $r_2$ denote a radius of curvature of a surface on the image side of the positive lens disposed nearest to the object in the second lens unit, and $v_{2p}$ denotes an average value of Abbe's number for a d-line of the positive lenses in the second lens unit.

When exceeding an upper limit value of conditional expression (5), correction of various aberrations becomes extremely difficult. Moreover, when exceeding an upper limit value of conditional expression (6), correction of the chromatic aberration of magnification becomes difficult.

When falling below a lower limit value of conditional expression (6), it is not a practical glass material.

As aforementioned, because an amount of aberration occurring in the positive lens on the object side of the second lens unit nearest to the object is large, when a decentering error occurs between the positive lens and the subsequent cemented lens, a degradation of performance becomes extremely large. Therefore, by combining the positive lens and the cemented lens, a cemented negative lens of three lenses is formed. Accordingly, it is possible to mend a problem in assembling, and to reduce the decentering error.

Moreover, according to a preferable aspect of the present invention, it is desirable that the third lens unit includes in order from the object side to the image side, an aperture stop, a biconvex positive lens, a cemented positive lens of a negative meniscus lens and a biconvex positive lens, and a biconvex positive lens or a cemented positive lens of a biconvex positive lens and a negative meniscus lens.

For correcting appropriately the spherical aberration occurring at the telephoto end side, the lens arrangement of the third lens unit is important. For guiding a light beam that is incident on the third lens unit as a divergent light beam from the second lens unit having a negative refractive power, rearward while converging gradually, a first positive lens component is necessary on the object side of the third lens unit nearest to the object side.

Moreover, according to a preferable aspect of the present invention, it is desirable that the third lens unit includes in order from the object side to the image side an aperture stop, a first positive lens component, a second lens component, and a third lens component.

Here, lens component means a lens having only two refractive surfaces which are in contact with air in a normal optical path, namely, an object-side surface and an image-side surface, and refers to one of a single lens and a cemented lens.

According to such an arrangement, a light beam that has passed through the first positive lens component is converged gradually while carrying out correction of aberrations such as the spherical aberration, the coma, and the astigmatism by the subsequent lens unit of the second positive lens component and the third positive lens component.

At this time, it is desirable to use at least one aspheric surface in the third lens unit. Particularly, letting the first positive lens component to be an aspheric surface is effective. Accordingly, it is possible to reduce the spherical aberration, and it is advantageous for achieving both of securing a favorable imaging performance and making an aperture large.

Moreover, there is a space between the first positive lens component and the second positive lens component, which is the maximum in the third lens unit. The second positive lens component and the third positive lens component are in proximity.

Moreover, it is desirable that the zoom lens satisfies conditional expressions (7), (8), (9), and (10).

$$65 < \nu_{3p} < 100 \quad (7)$$

$$0.5 < f_{3F}/f_{3R} < 2.0 \quad (8)$$

$$0.1 < d(A)/f_3 < 0.5 \quad (9)$$

$$1.45 < n_{3p} < 1.65 \quad (10)$$

where, $\nu_{3p}$ denotes an average value of Abbe's number for a d-line of positive lenses in the third lens unit, $f_{3F}$ denotes a focal length of the first positive lens component in the third lens unit, $f_{3R}$ denotes a composite focal length of the second positive lens component and the third positive lens component, d(A) denotes a distance between the first positive lens component and the second positive lens component, $f_3$ denotes a focal length of the third lens unit, and $n_{3p}$ denotes an average value of a refractive index for the d-line of the positive lenses in the third lens unit.

In the zoom lens according to the present embodiment, a full-aperture F-number 2.8 is maintained even at the telephoto end. For this, correction of the chromatic aberration is extremely important. Particularly, more telephotic the longitudinal chromatic aberration, larger is the amount of aberration remained. As a result of this, for securing high performance, sufficient correction of the longitudinal chromatic aberration is necessary.

Conditional expression (7) regulates a range appropriate for reducing the longitudinal chromatic aberration. When exceeding an upper limit value of conditional expression (7), it is not a practical glass material.

When falling below a lower limit value of conditional expression (7), the amount of chromatic aberration remained becomes large, which is not preferable.

On the other hand, when exceeding an upper limit value of conditional expression (8), a convergence effect of the first positive lens component becomes small, and a light-ray height in the subsequent lens becomes high. Moreover, it leads to an increase in a lens diameter, and it is not preferable even for aberration correction.

When falling below a lower limit value of conditional expression (8), the convergence effect of the first positive lens component becomes excessively large. Therefore, a measure such as increasing the number of lenses for the aberration correction becomes necessary, and it is not preferable.

When exceeding an upper limit value of conditional expression (9), it is advantageous for aberration correction. However, the overall length of lenses becomes long, and it is not preferable.

When falling below a lower limit value of conditional expression (9), the three positive lens components come too close, and correction of the coma in particular, becomes difficult.

When exceeding an upper limit value of conditional expression (10), Petzval's sum becomes excessively small and a curvature of field occurs in an over direction.

When falling below a lower limit value of conditional expression (10), conversely, Petzval's sum becomes excessively large and a curvature of field occurs in an under direction.

Moreover, according to a preferable aspect of the present invention, it is desirable that the fourth lens unit includes a cemented negative lens of a positive lens and a biconcave negative lens, and the zoom lens satisfies conditional expressions (11) and (12).

$$1.80 < n_{4p} < 2.00 \quad (11)$$

$$15 < \Delta\nu_4 < 40 \quad (12)$$

where, $n_{4p}$ denotes a refractive index for a d-line of the positive lens in the fourth lens unit, and $\Delta\nu_4$ denotes a difference in Abbe's number for the d-line of the positive lens in the fourth lens unit and Abbe's number for the d-line of the negative lens in the fourth lens unit.

By increasing a refractive index of the positive lens in the fourth lens unit to an extent of satisfying conditional expression (11), it is possible to reduce a volume of the positive lens. As a result of this, it is possible to realize making the positive lens light-weight.

When exceeding an upper limit value of conditional expression (11), a dispersibility and a transmittance of a glass material, or a workability of the glass material are degraded, and therefore it is not preferable.

When falling below a lower limit value of conditional expression (11), since a radius of curvature of a surface becomes small, the volume of the lens increases, and the weight of the lens also increases. Therefore, it is not preferable.

Conditional expression (12) is a conditional expression for correcting the chromatic aberration sufficiently in the fourth lens unit. The fourth lens unit has a function of correcting a shift in an image plane due to zooming of the second lens unit, and a function of focusing from an infinite object point to an object point at a close distance. It is possible to correct favorably a fluctuation in the chromatic aberration at the telephoto end in particular, caused due to the focusing.

When exceeding an upper limit value of conditional expression (12), realistically, the refractive index of the positive lens is lowered. Therefore, it is not preferable.

When falling below a lower limit value of conditional expression (12), a change in the chromatic aberration becomes large, and therefore it is not preferable.

Regarding focusing to an object point at a close distance, securing a favorable aberration correction from the infinite object point to the object point at a close distance while making small an amount of movement of the focusing lens unit necessary for focusing, and making the focusing lens light-weight, is an important issue of the present embodiment.

Therefore, the focusing is carried out by moving the fourth lens unit and the fifth lens unit independently. At this time, it is preferable that the zoom lens satisfies the following conditional expression (13).

$$0.2<|\Delta G_{5(W)}/\Delta G_{4(W)}|<3.0 \quad (13)$$

where, $\Delta G_{4(W)}$ denotes an amount of movement of the fourth lens unit at the time of focusing from an infinite object point to an object point at a close distance at the wide angle end, and $\Delta G_{5(W)}$ denotes an amount of movement of the fifth lens unit at the time of focusing from an infinite object point to an object point at a close distance at the wide angle end.

If an upper limit value of conditional expression (13) is exceeded, and the amount of movement of the fifth lens unit becomes large, a curvature of field is worsened.

When falling below a lower limit value of conditional expression (13), and the amount of movement of the fifth lens unit becomes small, an effect of aberration correction becomes small, and therefore it is not preferable.

On the other hand, as a trend of recent years, there has been an increasing need of not only a still photography but also a video photography, and even in an interchangeable lens digital camera, an interchangeable lens optimized for a video photography function has been sought.

Generally, in video photography, it is necessary to maintain a focused state by making an autofocus function work all the time. As one of the methods thereof, a method in which, a focusing lens is moved by a minute amount all the time, immediately after a focused position (called as a wobbling) has been known.

By carrying out wobbling, a change in a contrast of an image on an image pickup surface is measured, and in a case in which, the focused state is judged to have changed, the focusing lens unit is moved appropriately for refocusing once again. By such wobbling function, even when a distance between the zoom lens and an object changes, the focused state is maintained all the time.

However, in accordance with a frame rate of a camera main-body, an extremely high-speed movement is necessary. For carrying out an appropriate drive control, the focusing lens unit is also sought to have a light-weight and a small amount of movement. Moreover, since a generation of noise due to wobbling is also recorded as a sound in video, making it a low-noise has also been an important issue.

Normally, the focusing lens unit and the wobbling lens unit are the same in a large number of cases. However, there are also cases in which, the focusing lens unit and the wobbling lens unit are arranged as separate lens units.

In such manner, there are many issues in a lens dealing with video photography, and making the focusing lens unit light-weight has been sought in particular. In the present embodiment, finding a solution to such issues is also an object, and by using the aforementioned lens arrangement, small-sizing and light-weight of the focusing lens unit are realized.

A zoom lens apparatus according to a sixth embodiment of the present invention includes the abovementioned zoom lens, and a mount portion which enables to connect the zoom lens to a camera main-body.

Accordingly, it is possible to provide a zoom lens apparatus which includes a small-size zoom lens which is advantageous for securing both namely, the zooming ratio and the brightness. Particularly, it is possible to provide a zoom lens apparatus which includes a telephoto zoom lens having a large aperture and high performance, which can be used for an interchangeable lens application, and which is preferable also for video photography in particular.

By satisfying simultaneously a plurality of the aforementioned arrangements mutually, the effect can be shown even more assuredly.

Regarding the aforementioned conditional expressions, satisfying a plurality of conditional expressions simultaneously, and letting the aforementioned conditional expressions have the following ranges, effects thereof can be shown more assuredly. And therefore it is preferable to satisfy a plurality of the aforementioned conditional expressions simultaneously.

For conditional expression (1), it is more preferable to let the lower limit value to be 1.2, and 1.26 is even more preferable.

Moreover, for conditional expression (1), it is more preferable to let the upper limit value to be 1.7, and 1.6 is even more preferable.

For conditional expression (2), it is more preferable to let the lower limit value to be −0.01, and 0 and above is even more preferable.

Moreover, for conditional expression (2), it is more preferable to let the upper limit value to be 0.3, and 0.25 is even more preferable.

For conditional expression (3), it is more preferable to let the lower limit value to be 1.0, and 1.5 is even more preferable.

Moreover, for conditional expression (3), it is more preferable to let the upper limit value to be 2.5, and 2.2 is even more preferable.

For conditional expression (4), it is more preferable to let the lower limit value to be 75, and 80 is even more preferable.

Moreover, for conditional expression (4), it is more preferable to let the upper limit value to be 95, and 90 is even more preferable.

For conditional expression (5), it is more preferable to let the lower limit value to be 1.0, and 1.03 is even more preferable.

Moreover, for conditional expression (5), it is more preferable to let the upper limit value to be 1.9, and 1.85 is even more preferable.

For conditional expression (6), it is more preferable to let the lower limit value to be 21, and 23 is even more preferable.

Moreover, for conditional expression (6), it is more preferable to let the upper limit value to be 27, and 26.5 is even more preferable.

For conditional expression (7), it is more preferable to let the lower limit value to be 68, and 71 is even more preferable.

Moreover, for conditional expression (7), it is more preferable to let the upper limit value to be 90, and 80 is even more preferable.

For conditional expression (8), it is more preferable to let the lower limit value to be 0.8, and 1.0 is even more preferable.

Moreover, for conditional expression (8), it is more preferable to let the upper limit value to be 1.7, and 1.4 is even more preferable.

For conditional expression (9), it is more preferable to let the lower limit value to be 0.15, and 0.2 is even more preferable.

Moreover, for conditional expression (9), it is more preferable to let the upper limit value to be 0.4, and 0.3 is even more preferable.

For conditional expression (10), it is more preferable to let the lower limit value to be 1.5, and 1.53 is even more preferable.

Moreover, for conditional expression (10), it is more preferable to let the upper limit value to be 1.60, and 1.57 is even more preferable.

For conditional expression (11), it is more preferable to let the lower limit value to be 1.85, and 1.9 is even more preferable.

Moreover, for conditional expression (11), it is more preferable to let the upper limit value to be 2.96, and 2.93 is even more preferable.

For conditional expression (12), it is more preferable to let the lower limit value to be 20, and 25 is even more preferable.

Moreover, for conditional expression (12), it is more preferable to let the upper limit value to be 35, and 32 is even more preferable.

For conditional expression (13), it is more preferable to let the lower limit value to be 0.5, and 0.8 is even more preferable.

Moreover, for conditional expression (13), it is more preferable to let the upper limit value to be 2.5, and 2.0 is even more preferable.

Next, zoom lenses according to examples from an example 1 to an example 6 will be described below. FIG. 1A to FIG. 6C are lens cross-sectional views at the time of focusing at an infinite object point of the examples from the example 1 to the example 6, where, FIG. 1A, FIG. 2A, FIG. 3A, FIG. 4A, FIG. 5A, and FIG. 6A show lens cross-sectional views at a wide angle end, FIG. 1B, FIG. 2B, FIG. 3B, FIG. 4B, FIG. 5B, and FIG. 6B show lens cross-sectional views in an intermediate focal length state, and FIG. 1C, FIG. 2C, FIG. 3C, FIG. 4C, FIG. 5C, and FIG. 6C show lens cross-sectional views at a telephoto end.

In examples from the example 1 to the example 6, the zoom lens includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power.

At the time of zooming from the wide angle end to the telephoto end, the second lens unit G2 moves toward an image side monotonously, the fourth lens unit G4, after moving toward the image side, moves toward the object side, the fifth lens unit G5 moves slightly, and the sixth lens unit G6 is fixed with respect to an image plane. Moreover, at the time of focusing, the focusing from the infinite object point to an object point at a close distance is carried out by moving the fourth lens unit G4 and the fifth lens unit G5 independently.

An aperture stop S is disposed on the object side of the third lens unit G3 immediately before the object, and moves integrally with the third lens unit G3.

A maximum diameter of an aperture of the aperture stop S increases from the wide angle end to the telephoto end, and is arranged to be such that an F-number is almost a constant value (2.88) irrespective of a focal length in a state of being focused at infinity.

A flat and parallel plate C which is intended as a member optically equivalent to a cover glass of an image pickup element and filters, and an image pickup plane I of the image pickup element are positioned on the image side of the zoom lens.

Figure 1B:
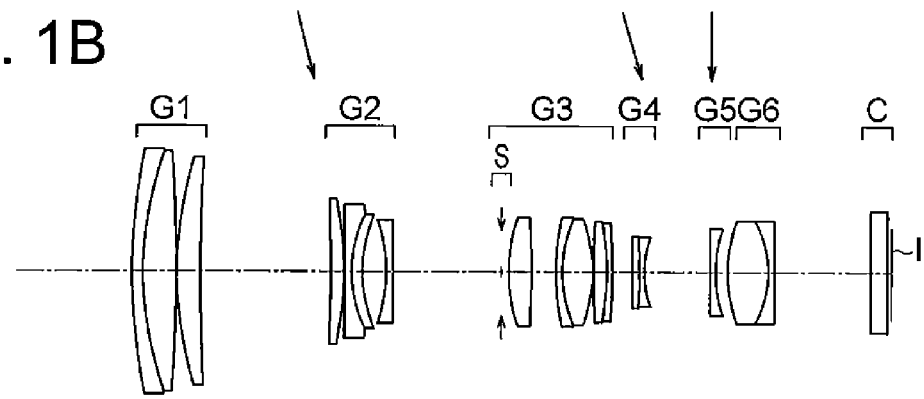
Figure 1C:
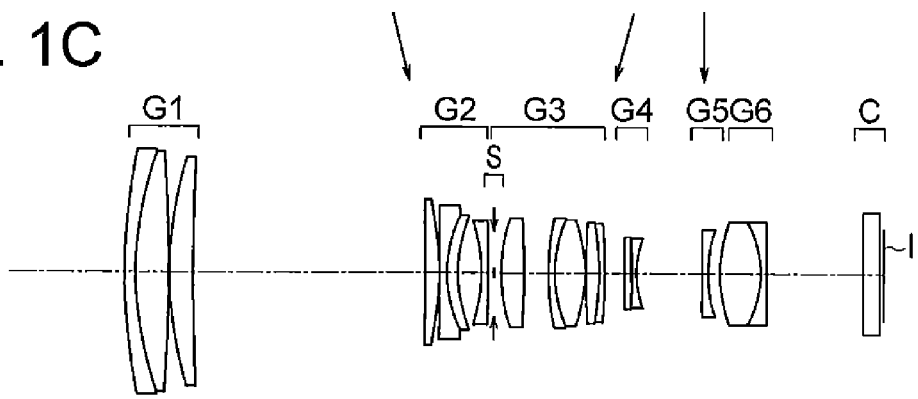

FIG. 1A, FIG. 1B, and FIG. 1C are cross-sectional views along an optical axis of a zoom lens according to the example 1 of the present invention.

A first lens unit G1 includes three lenses namely, a negative meniscus lens L1 having a convex surface directed toward an object side, a biconvex positive lens L2, and a positive meniscus lens L3 having a convex surface directed toward the object side. Here, the negative meniscus lens L1 and the biconvex positive lens L2 are cemented.

A second lens unit G2 includes four lenses namely, a positive meniscus lens L4 having a convex surface directed toward an image side, a biconcave negative lens L5, a positive meniscus lens L6 having a convex surface directed toward the object side, and a negative meniscus lens L7 having a convex surface directed toward the image side. Here, the biconcave negative lens L5 and the positive meniscus lens L6 are cemented A third lens unit G3 includes a stop S, and five lenses namely, a biconvex positive lens L8 of which, both surfaces are aspheric surfaces, a negative meniscus lens L9 having a convex surface directed toward the object side, a biconvex positive lens L10, a biconvex positive lens L11, and a negative lens L12. Here, the negative meniscus lens L9 and the biconvex positive lens L10 are cemented. Moreover, the biconvex positive lens L11 and the negative lens L12 are cemented.

A fourth lens unit G4 includes two lenses namely, a planoconvex positive lens L13 and a biconcave negative lens L14 of which, an image-side surface is an aspheric surface. Here, the planoconvex positive lens L13 and the biconcave negative lens L14 are cemented.

A fifth lens unit G5 includes one lens namely, a biconcave negative lens L15.

A sixth lens unit G6 includes two lenses namely, a biconvex positive lens L16 of which an object-side surface is an aspheric surface, and a concave-plano negative lens L17. Here, the biconvex positive lens L16 and the concave-plano negative lens L17 are cemented.

Movement of each lens unit at the time of zooming from a wide angle end to a telephoto end will be described below.

The first lens unit G1, the third lens unit G3, and the sixth lens unit G6 are fixed with respect to an image plane.

The second lens unit G2 moves toward the image side monotonously.

The fourth lens unit G4 moves while depicting a convex locus toward the image side.

The fifth lens unit G5 moves slightly.

At the time of focusing at an object point at a close distance, the fourth lens unit G4 moves toward the image side monotonously. The fifth lens unit G5, at the wide angle end, moves toward the image side monotonously, and at the telephoto end, moves while depicting a convex locus toward the object side.

Figure 2A:
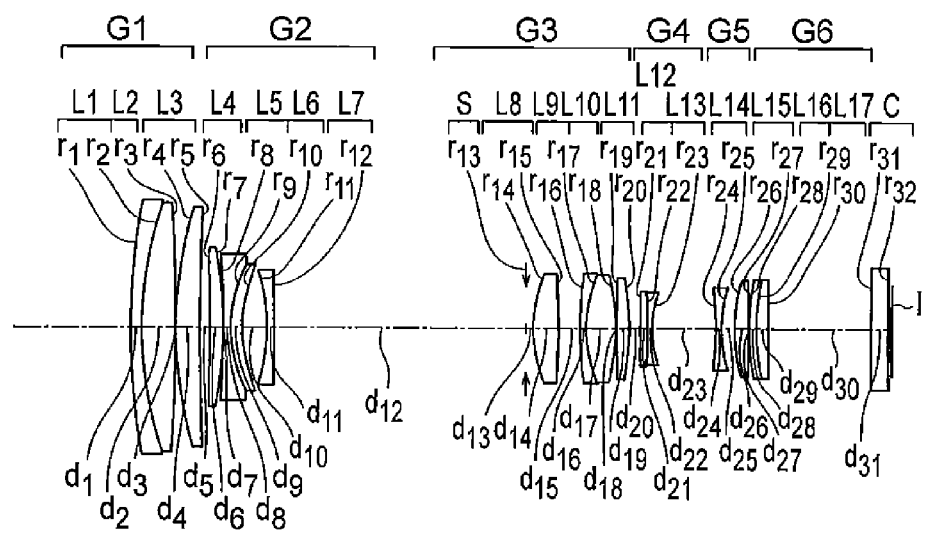
FIG. 2A, FIG. 2B, and FIG. 2C are diagrams similar to FIG. 1A, FIG. 1B, and FIG. 1C, of a zoom lens according to an example 2 of the present invention.
Figure 2B:
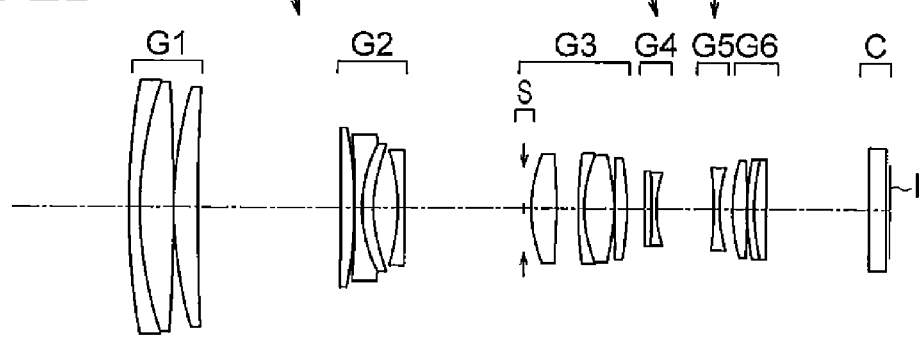
Figure 2C:
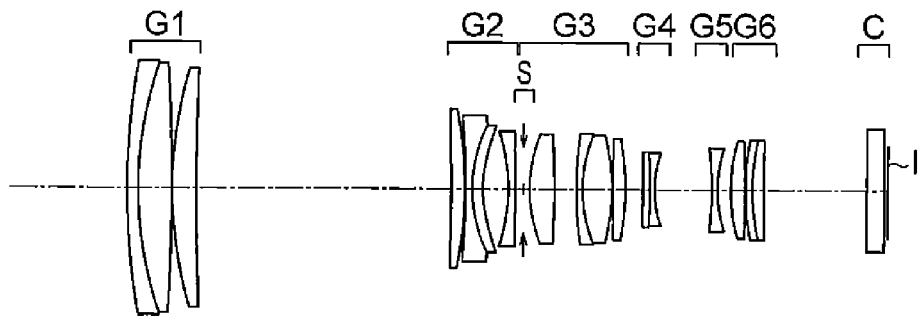

FIG. 2A, FIG. 2B, and FIG. 2C are cross-sectional views along an optical axis of a zoom lens according to the example 2 of the present invention.

A first lens unit G1 includes three lenses namely, a negative meniscus lens L1 having a convex surface directed toward an object side, a biconvex positive lens L2, and a positive meniscus lens L3 having a convex surface directed toward the object side. Here, the negative meniscus lens L1 and the biconvex positive lens L2 are cemented.

A second lens unit G2 includes four lenses namely, a positive meniscus lens L4 having a convex surface directed toward an image side, a biconcave negative lens L5, a positive meniscus lens L6 having a convex surface directed toward the object side, and a biconcave negative lens L7. Here, the biconcave negative lens L5 and the positive meniscus lens L6 are cemented.

A third lens unit G3 includes a stop S, and four lenses namely, a biconvex positive lens L8 of which, both surfaces are aspheric surfaces, a negative meniscus lens L9 having a convex surface directed toward the object side, a biconvex positive lens L10, and a biconvex positive lens L11 of which, both surfaces are aspheric surfaces. Here, the negative meniscus lens L9 and the biconvex positive lens L10 are cemented.

A fourth lens unit G4 includes two lenses namely, a biconvex positive lens L12 and a biconcave negative lens L13 of which, a surface toward the image side is an aspheric surface. Here, the biconvex positive lens L12 and the biconcave negative lens L13 are cemented.

A fifth lens unit G5 includes one lens namely, a biconcave negative lens L14.

A sixth lens unit G6 includes three lenses namely, a biconvex positive lens L15, a negative meniscus lens L16 having a convex surface directed toward the object side, and a positive meniscus lens L17 having a convex surface directed toward the object side. Here, the negative meniscus lens L16 and the positive meniscus lens L17 are cemented.

Movement of each lens unit at the time of zooming from a wide angle end to a telephoto end will be described below.

The first lens unit G1, the third lens unit G3, and the sixth lens unit G6 are fixed with respect to an image plane.

The second lens unit G2 moves toward the image side monotonously.

The fourth lens unit G4 moves while depicting a convex locus toward the image side.

The fifth lens unit G5 moves slightly.

At the time of focusing at an object point at a close distance, the fourth lens unit G4 moves toward the image side monotonously. The fifth lens unit G5, at the wide angle end, moves toward the image side monotonously, and at the telephoto end, moves while depicting a convex locus toward the object side.

Figure 3A:
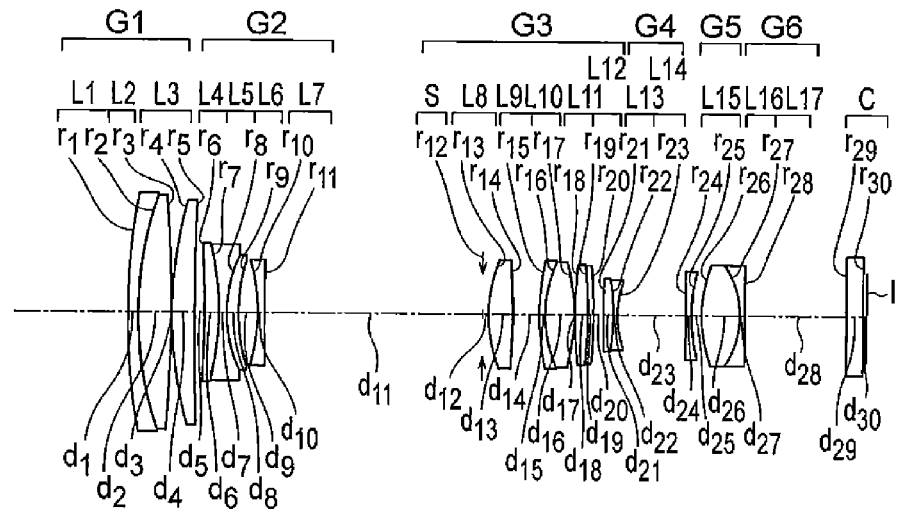
FIG. 3A, FIG. 3B, and FIG. 3C are diagrams similar to FIG. 1A, FIG. 1B, and FIG. 1C, of a zoom lens according to an example 3 of the present invention.
Figure 3B:
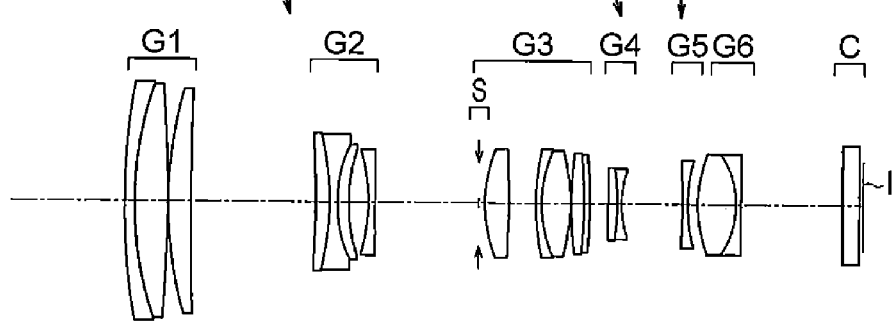
Figure 3C:
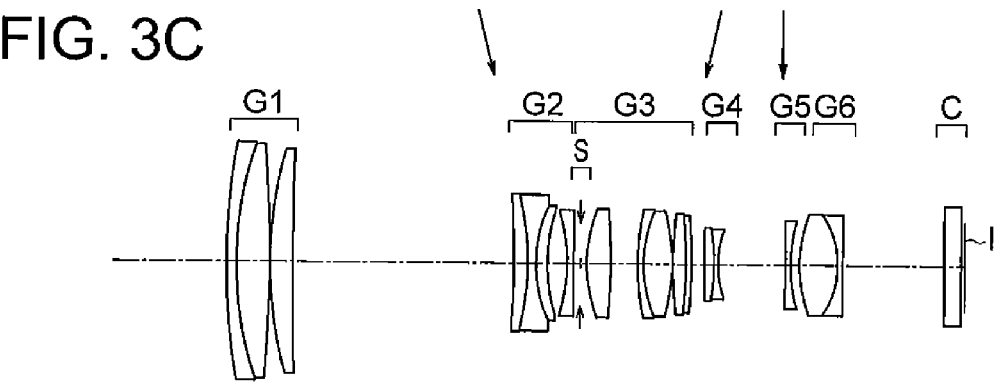

FIG. 3A, FIG. 3B, and FIG. 3C are cross-sectional views along an optical axis of a zoom lens according to the example 3 of the present invention.

A first lens unit G1 includes three lenses namely, a negative meniscus lens L1 having a convex surface directed toward an object side, a biconvex positive lens L2, and a positive meniscus lens L3 having a convex surface directed toward the object side. Here, the negative meniscus lens L1 and the biconvex positive lens L2 are cemented.

A second lens unit G2 includes four lenses namely, a positive meniscus lens L4 having a convex surface directed toward an image side, a biconcave negative lens L5, a positive meniscus lens L6 having a convex surface directed toward the object side, and a biconcave negative lens L7. Here, the three lenses namely, the positive meniscus lens L4, the biconcave negative lens L5, and the positive meniscus lens L6 are cemented.

A third lens unit G3 includes a stop S, and five lenses namely, a biconvex positive lens L8 of which, both surfaces are aspheric surfaces, a positive meniscus lens L9 having a convex surface directed toward an object side, a biconvex positive lens L10, a biconvex positive lens L11, and a negative meniscus lens L12 having a convex surface directed toward an image side. Here, the positive meniscus lens L9 and the biconvex positive lens L10 are cemented. Moreover, the biconvex positive lens L11 and the negative meniscus lens L12 are cemented.

A fourth lens unit G4 includes two lenses namely, a planoconvex positive lens L13 and a biconcave negative lens L14 of which, an image-side surface is an aspheric surface. Here, the planoconvex positive lens L13 and the biconcave negative lens L14 are cemented.

A fifth lens unit G5 includes one lens namely, a biconcave negative lens L15.

A sixth lens unit G6 includes two lenses namely, a biconvex positive lens L16 of which, an object-side surface is an aspheric surface and a biconcave negative lens L17. Here, the biconvex positive lens L16 and the biconcave negative lens L17 are cemented.

Movement of each lens unit at the time of zooming from a wide angle end to a telephoto end will be described below.

The first lens unit G1, the third lens unit G3, and the sixth lens unit G6 are fixed with respect to an image plane.

The second lens unit G2 moves toward the image side monotonously.

The fourth lens unit G4 moves while depicting a convex locus toward the image side.

The fifth lens unit G5 moves slightly.

At the time of focusing at an object point at a close distance, the fourth lens unit G4 moves toward the image side monotonously. The fifth lens unit G5, at the wide angle end, moves toward the image side monotonously, and at the telephoto end, moves while depicting a convex locus toward the object side.

Figure 4A:
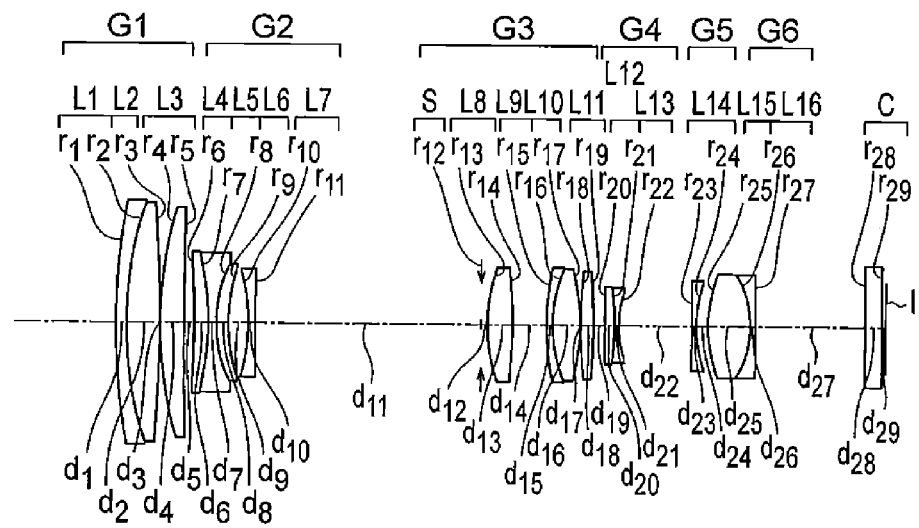
FIG. 4A, FIG. 4B, and FIG. 4C are diagrams similar to FIG. 1A, FIG. 1B, and FIG. 1C, of a zoom lens according to an example 4 of the present invention.
Figure 4B:
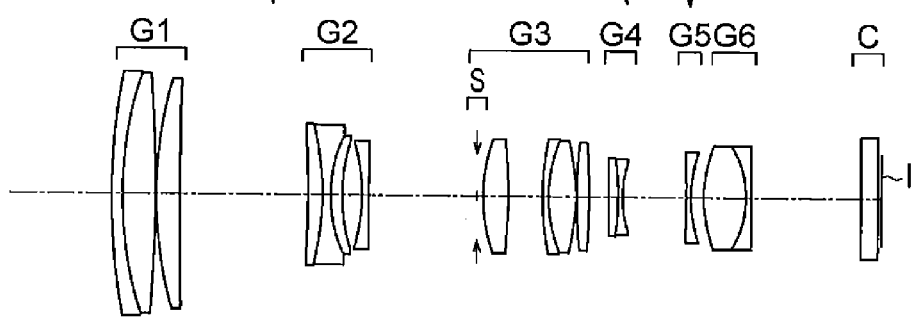
Figure 4C:
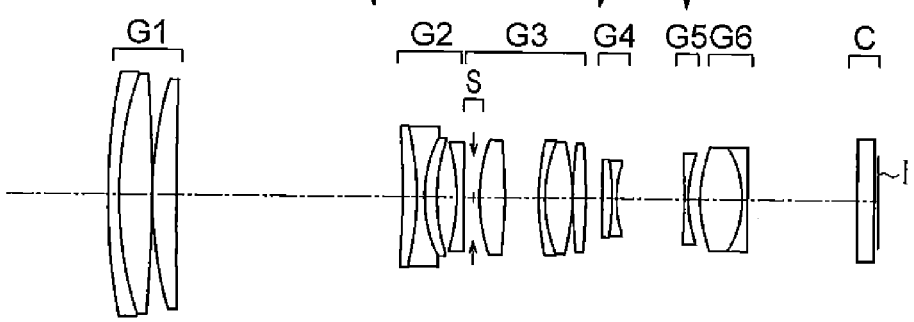

FIG. 4A, FIG. 4B, and FIG. 4C are cross-sectional views along an optical axis of a zoom lens according to the example 4 of the present invention.

A first lens unit G1 includes three lenses namely, a negative meniscus lens L1 having a convex surface directed toward an object side, a biconvex positive lens L2, and a positive meniscus lens L3 having a convex surface directed toward the object side. Here, the negative meniscus lens L1 and the biconvex positive lens L2 are cemented.

A second lens unit G2 includes four lenses namely, a positive meniscus lens L4 having a convex surface directed toward the object side, a biconcave negative lens L5, a positive meniscus lens L6 having a convex surface directed toward the object side, and a biconcave negative lens L7. Here, the three lenses namely, the positive meniscus lens L4, the biconcave negative lens L5, and the positive meniscus lens L6 are cemented.

A third lens unit G3 includes a stop S, and four lenses namely, a biconvex positive lens L8 of which, both surfaces are aspheric surfaces, a negative meniscus lens L9 having a convex surface directed toward the object side, a biconvex positive lens L10, and a biconvex positive lens L11. Here, the negative meniscus lens L9 and the biconvex positive lens L10 are cemented.

A fourth lens unit G4 includes two lenses namely, a biconvex positive lens L12 and a biconcave negative lens L13 of which, an image-side surface is an aspheric surface. Here, the biconvex positive lens L12 and the biconcave negative lens L13 are cemented.

A fifth lens unit G5 includes one lens namely, a biconcave negative lens L14.

A sixth lens unit G6 includes two lenses namely, a biconvex positive lens L15 of which, an object-side surface is an aspheric surface, and a concave-plano negative lens L16. Here, the biconvex positive lens L15 and the plano-concave negative lens L16 are cemented.

Movement of each lens unit at the time of zooming from a wide angle end to a telephoto end will be described below.

The first lens unit G1, the third lens unit G3, and the sixth lens unit G6 are fixed with respect to an image plane.

The second lens unit G2 moves toward the image side monotonously.

The fourth lens unit G4 moves while depicting a convex locus toward the image side.

The fifth lens unit G5 moves slightly.

At the time of focusing at an object point at a close distance, the fourth lens unit G4 moves toward the image side monotonously. The fifth lens unit G5, at the wide angle end, moves toward the image side monotonously, and at the telephoto end, moves while depicting a convex locus toward the object side.

Figure 5A:
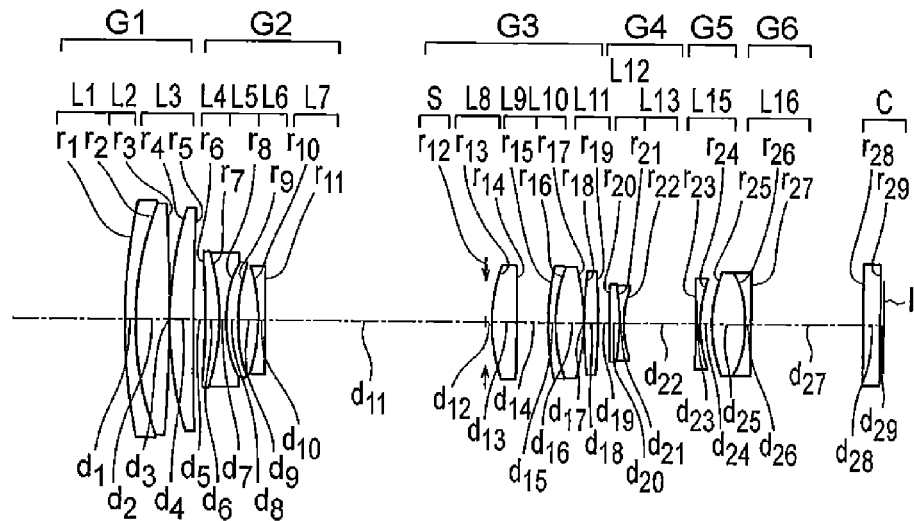
FIG. 5A, FIG. 5B, and FIG. 5C are diagrams similar to FIG. 1A, FIG. 1B, and FIG. 1C, of a zoom lens according to an example 5 of the present invention.
Figure 5B:
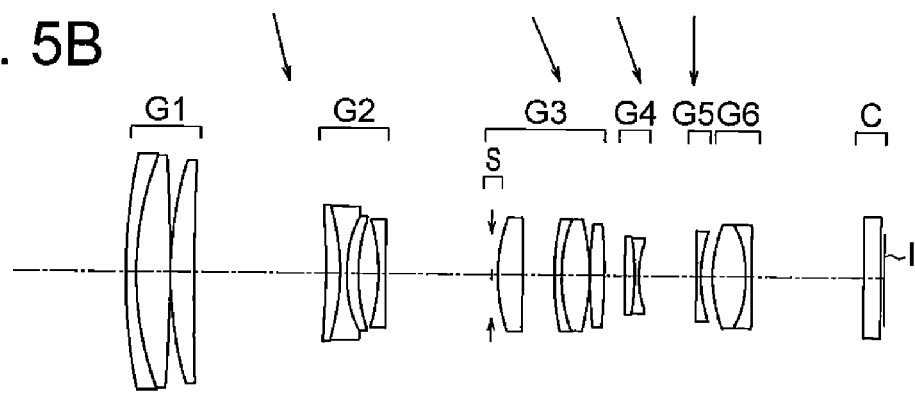
Figure 5C:
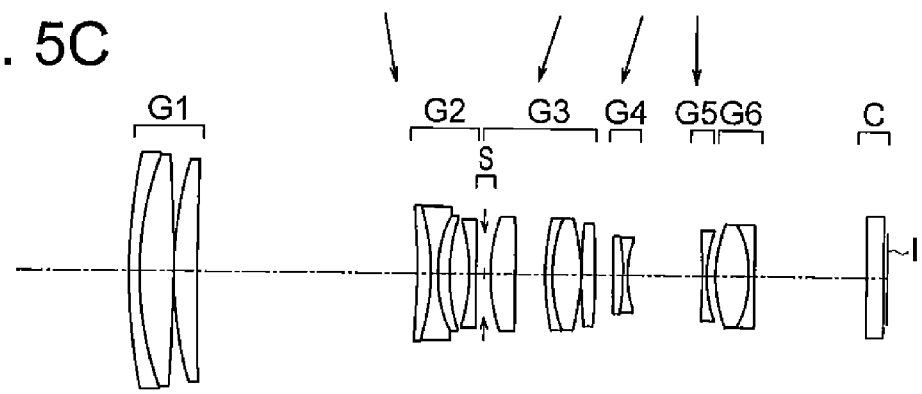

FIG. 5A, FIG. 5B, and FIG. 5C are cross-sectional views along an optical axis of a zoom lens according to the example 5 of the present invention.

A first lens unit G1 includes three lenses namely, a negative meniscus lens L1 having a convex surface directed toward an object side, a biconvex positive lens L2, and a positive meniscus lens L3 having a convex surface directed toward the object side. Here, the negative meniscus lens L1 and the biconvex positive lens L2 are cemented.

A second lens unit G2 includes four lenses namely, a positive meniscus lens L4 having a convex surface directed toward an image side, a biconcave negative lens L5, a positive meniscus lens L6 having a convex surface directed toward the object side, and a biconcave negative lens L7. Here, the three lenses namely, the positive meniscus lens L4, the biconcave negative lens L5, and the positive meniscus lens L6 are cemented.

A third lens unit G3 includes a stop S, and four lenses namely, a biconvex positive lens L8 of which, both surfaces are aspheric surfaces, a negative meniscus lens L9 having a convex surface directed toward the object side, a biconvex positive lens L10, and a biconvex positive lens L11. Here, the negative meniscus lens L9 and the biconvex positive lens L10 are cemented.

A fourth lens unit G4 includes two lenses namely, a biconvex positive lens L12, and a biconcave negative lens L13 of which, an image-side surface is an aspheric surface. Here, the biconvex positive lens L12 and the biconcave negative lens L13 are cemented.

A fifth lens unit G5 includes one lens namely, a biconcave negative lens L14.

A sixth lens unit G6 includes two lenses namely, a biconvex positive lens L15 of which, an object-side surface is an aspheric surface, and a concave-plano negative lens L16. Here, the biconvex positive lens L15 and the plano-concave negative lens L16 are cemented.

Movement of each lens unit at the time of zooming from a wide angle end to a telephoto end will be described below.

The first lens unit G1 and the sixth lens unit G6 are fixed with respect to an image plane.

The second lens unit G2 moves toward the image side monotonously.

The third lens unit G3 moves while depicting a convex locus toward the image side.

The fourth lens unit G4 moves while depicting a convex locus toward the image side.

The fifth lens unit G5 moves slightly.

At the time of focusing at an object point at a close distance, the fourth lens unit G4 moves toward the image side monotonously. The fifth lens unit G5, at the wide angle end, moves toward the image side monotonously, and at the telephoto end, moves while depicting a convex locus toward the object side.

Figure 6A:
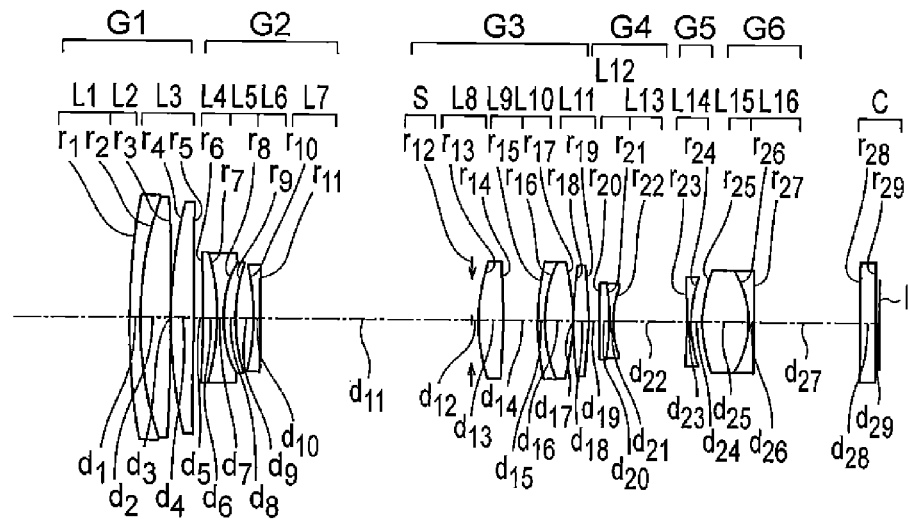
FIG. 6A, FIG. 6B, and FIG. 6C are diagrams similar to FIG. 1A, FIG. 1B, and FIG. 1C, of a zoom lens according to an example 6 of the present invention.
Figure 6B:
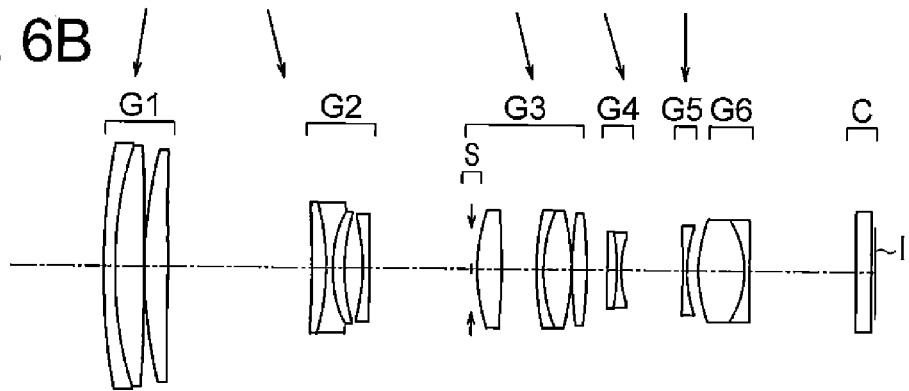
Figure 6C:
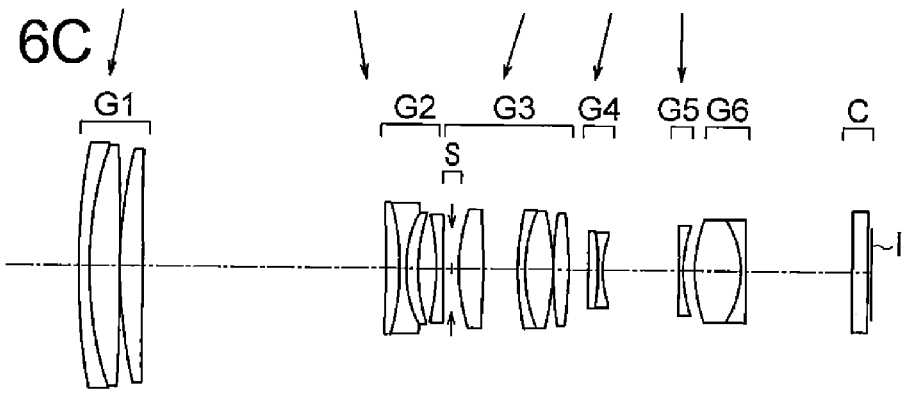

FIG. 6A, FIG. 6B, and FIG. 6C are cross-sectional views along an optical axis of a zoom lens according to the example 6 of the present invention.

A first lens unit G1 includes three lenses namely, a negative meniscus lens L1 having a convex surface directed toward an object side, a biconvex positive lens L2, and a convex-plano positive lens L3. Here, the negative meniscus lens L1 and the biconvex positive lens L2 are cemented.

A second lens unit G2 includes four lenses namely, a positive meniscus lens L4 having a convex surface directed toward an image side, a biconcave negative lens L5, a positive meniscus lens L6 having a convex surface directed toward the object side, and a concave-plano negative lens L7. Here, the three lenses namely, the positive meniscus lens L4, the biconcave negative lens L5, and the positive meniscus lens L6 are cemented.

The third lens unit G3 includes four lenses namely, a biconvex positive lens L8 of which, both surfaces are aspheric surfaces, a negative meniscus lens L9 having a convex surface directed toward the object side, a biconvex positive lens L10, and a biconvex positive lens L11. Here, the negative meniscus lens L9 and the biconvex positive lens L10 are cemented.

The fourth lens unit G4 includes two lenses namely, a biconvex positive lens L12, and a biconcave negative lens L13 of which, an image-side surface is an aspheric surface. Here, the biconvex positive lens L12 and the biconcave negative lens L13 are cemented.

A fifth lens unit G5 includes one lens namely, a biconcave negative lens L14.

A sixth lens unit G6 includes two lenses namely, a biconvex positive lens L15 of which, an object-side surface is an aspheric surface, and a concave-plano negative lens L16. Here, the biconvex positive lens L15 and the plano-concave negative lens L16 are cemented.

Movement of each lens unit at the time of zooming from a wide angle end to a telephoto end will be described below.

The first lens unit G1 moves toward the object side monotonously.

The second lens unit G2 moves toward the image side monotonously.

The third lens unit G3 moves while depicting a convex locus toward the image side.

The fourth lens unit G4 moves while depicting a convex locus toward the image side.

The fifth lens unit G5 moves slightly.

The sixth lens unit G6 is fixed with respect to an image plane.

At the time of focusing at an object point at a close distance, the fourth lens unit moves toward the image side monotonously. The first lens unit G5, at the wide angle end, moves toward the image side monotonously, and at the telephoto end, moves while depicting a convex locus toward the object side.

As in the present embodiment, when the first lens unit G1 and the sixth lens unit G6 are let to be fixed with respect to the image plane, it is possible to simplify a lens-frame structure. Moreover, it is possible to have a stable retention with a small change in a center of gravity at the time of zooming.

Furthermore, there is also an effect of preventing a sound generated at the time of zooming and at the time of focusing, from leaking to outside, in the sixth lens unit which is fixed.

Moreover, if the third lens unit G3 is also let to be fixed, it is possible to simplify further the lens-frame structure, and it is possible to improve substantially an ease of assembling of a lens frame.

Numerical data of each of the abovementioned examples is shown below.

Regarding symbols other than the aforementioned symbols, f denotes a focal length of the overall system, BF denotes a back focus, f1, f2, . . . denote focal lengths of lens systems respectively, IH denotes an image height, $F_{NO}$ denotes an F-number, ω denotes a half angle of view, "ST" denotes an intermediate focal length state, "WE" denotes a wide angle end state, "TE" denotes a telephoto end state, r denotes a radius of curvature of each lens, d denotes a distance between two lens surfaces, nd denotes a refractive index for a d-line of each lens, νd denotes Abbe's number for each lens. The overall length of the lens is a length obtained by adding the back focus to a distance from a front-most surface of the lens up to a rear-most surface of the lens. The BF (back focus) is expressed by air-converting a distance from the rear-most surface of the lens up to a paraxial image plane.

An aspheric surface shape is expressed by the following expression when x is let to be an optical axis letting a direction of travel of light to be positive, and y is let to be a direction orthogonal to the optical axis.

$$z=(y^2/r)/[1+\{1-(k+1)(y/r)^2\}^{1/2}]+A4y^4+A6y^6+A8y^8+A10y^{10}+A12y^{12}$$

where, r denotes a paraxial radius of curvature, k denotes a conical coefficient, and A4, A6, A8, A10, and A12 are aspheric coefficients of fourth order, sixth order, eighth order, tenth order, and twelfth order respectively. Moreover, in aspheric coefficients, '$E^{-n}$' (n is an integer) indicates '$10^{-n}$'.

Example 1

Unit mm

Surface data

| Surface no. | r | d | nd | νd |
|---|---|---|---|---|
| 1 | 132.3375 | 2.600 | 1.75520 | 27.51 |
| 2 | 82.5673 | 7.840 | 1.49700 | 81.61 |
| 3 | −416.6091 | 0.150 | | |
| 4 | 90.7260 | 5.490 | 1.43875 | 94.93 |
| 5 | 505.9141 | Variable | | |
| 6 | −508.8493 | 3.090 | 1.84666 | 23.78 |
| 7 | −91.3157 | 0.150 | | |
| 8 | −494.7262 | 1.600 | 1.49700 | 81.61 |
| 9 | 30.3801 | 2.570 | 1.84666 | 23.78 |
| 10 | 34.4288 | 5.760 | | |
| 11 | −37.0156 | 1.500 | 1.80400 | 46.57 |
| 12 | −1277.2503 | Variable | | |
| 13(Stop) | ∞ | 1.700 | | |
| 14* | 37.4087 | 5.490 | 1.49700 | 81.61 |
| 15* | −95.1515 | 5.790 | | |
| 16 | 62.6888 | 1.500 | 1.76182 | 26.52 |
| 17 | 33.5342 | 7.080 | 1.49700 | 81.61 |
| 18 | −35.3755 | 0.150 | | |
| 19 | 170.5876 | 3.080 | 1.59282 | 68.63 |
| 20 | −69.1970 | 1.300 | 1.64769 | 33.79 |
| 21 | −143.0040 | Variable | | |
| 22 | ∞ | 1.740 | 1.92286 | 18.90 |
| 23 | −79.8304 | 1.000 | 1.74320 | 49.29 |
| 24* | 20.8000 | Variable | | |
| 25 | −220.9532 | 1.200 | 1.59270 | 35.31 |
| 26 | 31.1472 | Variable | | |
| 27* | 31.3625 | 9.590 | 1.80610 | 40.88 |
| 28 | −24.0000 | 1.500 | 1.64769 | 33.79 |
| 29 | ∞ | 22.8000 | | |
| 30 | ∞ | 4.000 | 1.51633 | 64.14 |
| 31 | ∞ | 0.800 | | |
| Image plane | ∞ | | | |

Aspherical surface data

14th surface k = 0
A4 = −2.0856E−06, A6 = 7.5646E−09, A8 = 8.5023E−11, A10 = −3.0217E−13

15th surface k = 0
A4 = 1.4855E−05, A6 = 9.4303E−09, A8 = 1.0450E−10, A10 = −3.4344E−13

24th surface k = −0.6116
A4 = 3.8316E−06, A6 = 9.5787E−09, A8 = −2.1039E−11, A10 = 0.0000E+00

27th surface k = −0.0172
A4 = −3.6348E−06, A6 = −4.7277E−09, A8 = 1.3666E−12, A10 = 0.0000E+00

| | WE | ST | TE |
|---|---|---|---|
| Various data(at the time of focusing at infinite distance) | | | |
| Focal length | 40.81 | 77.27 | 147.00 |
| Fno | 2.88 | 2.88 | 2.88 |
| Angle of view(2ω) | 30.29° | 15.85° | 8.30° |
| Image height IH | 10.82 | | |
| BF | 26.24 | 26.24 | 26.24 (in air) |
| Lens total length | 176.90 | 176.90 | 176.90 (in air) |
| Unit separation (at the time of focusing at infinite distance) | | | |
| d5 | 2.37405 | 30.19289 | 54.03064 |
| d12 | 53.60336 | 25.78456 | 1.94673 |
| d21 | 2.66000 | 4.51221 | 3.35411 |

-continued

Unit mm

| | | | |
|---|---|---|---|
| d24 | 17.40204 | 14.96669 | 16.40901 |
| d26 | 2.75105 | 3.33413 | 3.05003 |

Unit separation(a distance between an object and an image is 0.7 m)

| | | | |
|---|---|---|---|
| d5 | 2.37405 | 30.19289 | 54.03064 |
| d12 | 53.60336 | 25.78456 | 1.94673 |
| d21 | 3.27485 | 6.82688 | 12.09392 |
| d24 | 17.34683 | 13.39102 | 7.01069 |
| d26 | 2.18626 | 2.59514 | 3.70860 |

Zoom ratio 3.60
Unit focal length

| | |
|---|---|
| f1 | 143.56 |
| f2 | −41.46 |
| f3 | 26.90 |
| f4 | −31.58 |
| f5 | −33.65 |
| f6 | 28.68 |

Example 2

Unit mm

Surface data

| Surface no. | r | d | nd | vd |
|---|---|---|---|---|
| 1 | 153.9342 | 2.600 | 1.75520 | 27.51 |
| 2 | 89.4468 | 8.140 | 1.53775 | 74.69 |
| 3 | −452.3801 | 0.150 | | |
| 4 | 105.1859 | 5.380 | 1.43875 | 94.93 |
| 5 | 537.9832 | Variable | | |
| 6 | −4251.3406 | 3.430 | 1.84666 | 23.78 |
| 7 | −100.3661 | 0.150 | | |
| 8 | −241.8921 | 1.600 | 1.48749 | 70.23 |
| 9 | 31.6758 | 2.740 | 1.84666 | 23.78 |
| 10 | 37.2900 | 5.720 | | |
| 11 | −43.0873 | 1.500 | 1.83481 | 42.71 |
| 12 | 1933.9919 | Variable | | |
| 13(Stop) | ∞ | 1.500 | | |
| 14* | 30.8214 | 6.050 | 1.49700 | 81.54 |
| 15* | −84.2156 | 4.980 | | |
| 16 | 74.7979 | 1.500 | 1.80000 | 29.84 |
| 17 | 26.8987 | 6.790 | 1.53775 | 74.69 |
| 18 | −48.7068 | 0.150 | | |
| 19* | 1439.8277 | 2.960 | 1.58313 | 59.38 |
| 20* | −57.5670 | Variable | | |
| 21 | 388.4895 | 1.720 | 1.92286 | 18.90 |
| 22 | −105.4464 | 1.100 | 1.74320 | 49.29 |
| 23* | 20.6986 | Variable | | |
| 24 | −65.1400 | 1.200 | 1.61293 | 37.00 |
| 25 | 30.3910 | Variable | | |
| 26 | 39.2635 | 3.250 | 1.83481 | 42.71 |
| 27 | −368.4753 | 0.150 | | |
| 28 | 59.0291 | 1.600 | 1.78472 | 25.68 |
| 29 | 42.3668 | 2.760 | 1.83481 | 42.71 |
| 30 | 300.0000 | 24.7617 | | |
| 31 | ∞ | 4.000 | 1.51633 | 64.14 |
| 32 | ∞ | 0.800 | | |
| Image plane | ∞ | | | |

Aspherical surface data

14th surface k = 0
A4 = −1.2015E−06, A6 = 1.3512E−08, A8 = 5.8359E−12, A10 = 0.0000E+00

-continued

Unit mm

15th surface k = 0
A4 = 2.0862E−05, A6 = 2.9914E−09, A8 = 1.7848E−11, A10 = 0.0000E+00

19th surface k = 0
A4 = 7.8102E−06, A6 = −3.7124E−08, A8 = −2.8476E−11, A10 = 0.0000E+00

20th surface k = 0
A4 = 4.2836E−06, A6 = −3.2041E−08, A8 = −1.2079E−11, A10 = 0.0000E+00

23th surface k = −0.7549
A4 = 6.2561E−06, A6 = 5.7318E−09, A8 = 0.0000E+00, A10 = 0.0000E+00

| | WE | ST | TE | |
|---|---|---|---|---|

Various data (at the time of focusing at infinite distance)

| | | | | |
|---|---|---|---|---|
| Focal length | 40.81 | 77.27 | 147.00 | |
| Fno | 2.87 | 2.88 | 2.88 | |
| Angle of view(2ω) | 30.38° | 15.83° | 8.29° | |
| Image height IH | 10.82 | | | |
| BF | 28.20 | 28.20 | 28.20 | (in air) |
| Lens total length | 176.88 | 176.88 | 176.88 | (in air) |

Unit separation (at the time of focusing at infinite distance)

| | | | |
|---|---|---|---|
| d5 | 2.00000 | 32.85155 | 59.48055 |
| d12 | 59.26660 | 28.41505 | 1.78605 |
| d20 | 2.50000 | 4.17182 | 3.17256 |
| d23 | 14.80290 | 12.98376 | 14.13682 |
| d25 | 2.99285 | 3.14018 | 2.98640 |

Unit separation (a distance between an object and an image is 0.7 m)

| | | | |
|---|---|---|---|
| d5 | 2.00000 | 32.85155 | 59.48055 |
| d12 | 59.26660 | 28.41505 | 1.78605 |
| d20 | 3.03444 | 6.37380 | 11.67490 |
| d23 | 15.16935 | 11.76028 | 6.00000 |
| d25 | 2.09200 | 2.16169 | 2.62095 |

Zoom ratio 3.60
Unit focal length

| | |
|---|---|
| f1 | 126.99 |
| f2 | −37.01 |
| f3 | 27.75 |
| f4 | −30.37 |
| f5 | −42.30 |
| f6 | 29.87 |

Example 3

Unit mm

Surface data

| Surface no. | r | d | nd | vd |
|---|---|---|---|---|
| 1 | 134.6640 | 2.600 | 1.75520 | 27.51 |
| 2 | 82.0435 | 7.960 | 1.49700 | 81.61 |
| 3 | −333.5590 | 0.150 | | |
| 4 | 95.3759 | 5.420 | 1.43875 | 94.93 |
| 5 | 729.5905 | Variable | | |
| 6 | −286.6882 | 3.650 | 1.84666 | 23.78 |
| 7 | −57.0915 | 1.600 | 1.49700 | 81.61 |
| 8 | 33.0091 | 2.710 | 1.80000 | 29.84 |

-continued

Unit mm

| | | | | |
|---|---|---|---|---|
| 9 | 41.9887 | 4.690 | | |
| 10 | −48.8343 | 1.500 | 1.83400 | 37.16 |
| 11 | 254.9157 | Variable | | |
| 12(Stop) | ∞ | 1.700 | | |
| 13* | 37.0537 | 5.610 | 1.49700 | 81.61 |
| 14* | −95.8319 | 6.210 | | |
| 15 | 54.3079 | 1.500 | 1.78470 | 26.29 |
| 16 | 29.1473 | 7.070 | 1.49700 | 81.61 |
| 17 | −38.8564 | 0.150 | | |
| 18 | 172.9014 | 2.970 | 1.59282 | 68.63 |
| 19 | −94.3770 | 1.300 | 1.64769 | 33.79 |
| 20 | −153.0318 | Variable | | |
| 21 | ∞ | 2.150 | 1.92286 | 18.90 |
| 22 | −70.3479 | 1.000 | 1.74320 | 49.29 |
| 23* | 20.9142 | Variable | | |
| 24 | −180.0000 | 1.000 | 1.59270 | 35.31 |
| 25 | 29.1856 | Variable | | |
| 26* | 29.2737 | 9.340 | 1.80610 | 40.88 |
| 27 | −21.1546 | 1.300 | 1.64769 | 33.79 |
| 28 | 1113.5701 | 24.7578 | | |
| 29 | ∞ | 4.000 | 1.51633 | 64.14 |
| 30 | ∞ | 0.800 | | |
| Image plane | ∞ | | | |

Aspherical surface data

13th surface k = 0
A4 = −2.8598E−06, A6 = −3.7238E−09, A8 = 9.4799E−11, A10 = −4.0541E−13

14th surface k = 0
A4 = 1.2064E−05, A6 = −3.1110E−09, A8 = 1.0016E−10, A10 = −4.2262E−13

23th surface k = −0.6101
A4 = 3.5215E−06, A6 = 1.5005E−08, A8 = −2.5606E−11, A10 = 0.0000E+00

26th surface k = −0.6856
A4 = −1.7892E−06, A6 = −3.4231E−09, A8 = −1.2749E−12, A10 = 0.0000E+00

| | WE | ST | TE | |
|---|---|---|---|---|
| Various data (at the time of focusing at infinite distance) | | | | |
| Focal length | 40.80 | 77.27 | 147.00 | |
| Fno | 2.87 | 2.88 | 2.89 | |
| Angle of view(2ω) | 30.81° | 15.95° | 8.30° | |
| Image height IH | 10.82 | | | |
| BF | 28.20 | 28.20 | 28.20 | (in air) |
| Lens total length | 176.90 | 176.90 | 176.90 | (in air) |
| Unit separation (at the time of focusing at infinite distance) | | | | |
| d5 | 2.43384 | 29.86322 | 53.34817 | |
| d11 | 52.93963 | 25.51030 | 2.02524 | |
| d20 | 2.50000 | 4.34373 | 2.92989 | |
| d23 | 16.65500 | 14.47684 | 16.47460 | |
| d25 | 2.59450 | 2.92887 | 2.34509 | |
| Unit separation (a distance between an object and an image is 0.7 m) | | | | |
| d5 | 2.43384 | 29.86322 | 53.34817 | |
| d11 | 52.93963 | 25.51030 | 2.02524 | |
| d20 | 3.14983 | 6.79377 | 11.96113 | |
| d23 | 16.59950 | 12.63624 | 6.59674 | |
| d25 | 2.00000 | 2.31944 | 3.19176 | |

-continued

Unit mm

Zoom ratio 3.60
Unit focal length

| | |
|---|---|
| f1 | 129.62 |
| f2 | −36.71 |
| f3 | 28.08 |
| f4 | −32.30 |
| f5 | −42.93 |
| f6 | 32.04 |

Example 4

Unit mm

Surface data

| Surface no. | r | d | nd | vd |
|---|---|---|---|---|
| 1 | 137.0268 | 2.600 | 1.78470 | 26.29 |
| 2 | 86.6508 | 7.760 | 1.49700 | 81.61 |
| 3 | −321.6069 | 0.150 | | |
| 4 | 96.8154 | 5.260 | 1.43875 | 94.93 |
| 5 | 624.2467 | Variable | | |
| 6 | −227.2066 | 3.370 | 1.80810 | 22.76 |
| 7 | −59.4074 | 1.600 | 1.48749 | 70.23 |
| 8 | 30.8341 | 2.750 | 1.80000 | 29.84 |
| 9 | 39.2048 | 4.990 | | |
| 10 | −49.6375 | 1.500 | 1.83481 | 42.73 |
| 11 | 458.1191 | Variable | | |
| 12(Stop) | ∞ | 1.800 | | |
| 13* | 39.4392 | 5.760 | 1.49700 | 81.61 |
| 14* | −87.6954 | 7.980 | | |
| 15 | 70.3121 | 1.500 | 1.84666 | 23.78 |
| 16 | 32.8253 | 6.580 | 1.59282 | 68.63 |
| 17 | −51.5148 | 0.150 | | |
| 18 | 129.4168 | 3.100 | 1.49700 | 81.61 |
| 19 | −94.0670 | Variable | | |
| 20 | 789.7458 | 2.000 | 1.92286 | 18.90 |
| 21 | −86.5458 | 1.000 | 1.74320 | 49.29 |
| 22* | 21.6608 | Variable | | |
| 23 | −356.0768 | 1.000 | 1.62004 | 36.26 |
| 24 | 28.8000 | Variable | | |
| 25* | 31.6086 | 9.580 | 1.80610 | 40.88 |
| 26 | −24.0000 | 1.300 | 1.64769 | 33.79 |
| 27 | ∞ | 26.0632 | | |
| 28 | ∞ | 4.000 | 1.51633 | 64.14 |
| 29 | ∞ | 0.800 | | |
| Image plane | ∞ | | | |

Aspherical surface data

13th surface k = 0
A4 = −3.1251E−06, A6 = −3.8756E−10, A8 = 5.5927E−11, A10 = −1.4099E−13

14th surface k = 0
A4 = 1.0047E−05, A6 = −3.0390E−10, A8 = 5.4533E−11, A10 = −1.3296E−13

22th surface k = −0.0326
A4 = −2.5854E−06, A6 = 2.4119E−09, A8 = −7.1028E−11, A10 = 1.4991E−13

25th surface k = −0.7171
A4 = 7.9298E−07, A6 = −2.8322E−09, A8 = 2.5344E−12, A10 = 0.0000E+00

-continued

Unit mm

| | WE | ST | TE | |
|---|---|---|---|---|
| Various data (at the time of focusing at infinite distance) | | | | |
| Focal length | 40.81 | 77.27 | 147.00 | |
| Fno | 2.88 | 2.88 | 2.88 | |
| Angle of view(2ω) | 30.86° | 15.95° | 8.30° | |
| Image height IH | 10.82 | | | |
| BF | 29.50 | 29.50 | 29.50 | (in air) |
| Lens total length | 179.90 | 179.90 | 179.90 | (in air) |
| Unit separation (at the time of focusing at infinite distance) | | | | |
| d5 | 2.56328 | 30.41889 | 53.87892 | |
| d11 | 53.22784 | 25.37230 | 1.91217 | |
| d19 | 2.50000 | 4.62391 | 3.89046 | |
| d22 | 17.30858 | 14.85531 | 16.19460 | |
| d24 | 3.06837 | 3.39767 | 2.79195 | |
| Unit separation (a distance between an object and an image is 0.7 m) | | | | |
| d5 | 2.56328 | 30.41889 | 53.87892 | |
| d11 | 53.22784 | 25.37230 | 1.91217 | |
| d19 | 3.12034 | 6.98082 | 12.71907 | |
| d22 | 17.25696 | 13.14454 | 6.51353 | |
| d24 | 2.50000 | 2.75153 | 3.64447 | |

Zoom ratio 3.60
Unit focal length

| f1 | 126.30 |
|---|---|
| f2 | −35.94 |
| f3 | 28.37 |
| f4 | −33.59 |
| f5 | −42.91 |
| f6 | 32.12 |

Example 5

Unit mm

Surface data

| Surface no. | r | d | nd | νd |
|---|---|---|---|---|
| 1 | 134.9486 | 2.600 | 1.78470 | 26.29 |
| 2 | 85.7108 | 7.710 | 1.49700 | 81.61 |
| 3 | −378.5479 | 0.150 | | |
| 4 | 97.2254 | 5.570 | 1.43875 | 94.93 |
| 5 | 1550.7095 | Variable | | |
| 6 | −193.9455 | 3.340 | 1.80810 | 22.76 |
| 7 | −56.1806 | 1.600 | 1.48749 | 70.23 |
| 8 | 30.9727 | 2.720 | 1.80000 | 29.84 |
| 9 | 39.6063 | 4.620 | | |
| 10 | −49.0198 | 1.500 | 1.83481 | 42.73 |
| 11 | 412.1838 | Variable | | |
| 12(Stop) | ∞ | 1.500 | | |
| 13* | 36.8396 | 5.930 | 1.49700 | 81.61 |
| 14* | −99.6733 | 7.260 | | |
| 15 | 71.6875 | 1.500 | 1.84666 | 23.78 |
| 16 | 32.9642 | 6.890 | 1.59282 | 68.63 |
| 17 | −48.6098 | 0.150 | | |
| 18 | 160.2791 | 3.340 | 1.49700 | 81.61 |
| 19 | −108.2042 | Variable | | |
| 20 | 612.6728 | 2.000 | 1.92286 | 18.90 |
| 21 | −91.2779 | 1.000 | 1.74320 | 49.29 |
| 22* | 22.2784 | Variable | | |
| 23 | −767.1005 | 1.000 | 1.62004 | 36.26 |
| 24 | 27.5755 | Variable | | |
| 25* | 31.2366 | 7.690 | 1.80610 | 40.88 |
| 26 | −26.4752 | 1.300 | 1.64769 | 33.79 |
| 27 | ∞ | 26.8405 | | |
| 28 | ∞ | 4.000 | 1.51633 | 64.14 |

-continued

Unit mm

| 29 | ∞ | 0.800 |
|---|---|---|
| Image plane | ∞ | |

Aspherical surface data

13th surface
k = 0
A4 = −1.4143E−06, A6 = 7.9218E−09, A8 = 3.1335E−11, A10 = 1.1407E−13
14th surface
k = 0
A4 = 1.2359E−05, A6 = 9.5589E−09, A8 = −2.5501E−11, A10 = 1.6154E−13
22th surface
k = −0.1354
A4 = −8.5033E−07, A6 = 1.0132E−09, A8 = 6.9260E−12, A10 = −3.4094E−13
25th surface
k = −0.7380
A4 = 2.2116E−06, A6 = −2.0812E−09, A8 = 4.2918E−12, A10 = 0.0000E+00

| | WE | ST | TE | |
|---|---|---|---|---|
| Various data (at the time of focusing at infinite distance) | | | | |
| Focal length | 40.80 | 77.27 | 147.00 | |
| Fno | 2.88 | 2.88 | 2.88 | |
| Angle of view(2ω) | 30.88° | 15.89° | 8.30° | |
| Image height | 10.82 | | | |
| BF | 30.28 | 30.28 | 30.28 | (in air) |
| Lens total length | 176.90 | 176.90 | 176.90 | (in air) |
| Unit separation (at the time of focusing at infinite distance) | | | | |
| d5 | 2.49430 | 30.59582 | 51.19639 | |
| d11 | 52.44395 | 25.52830 | 2.00000 | |
| d19 | 2.50417 | 4.76227 | 4.18222 | |
| d22 | 17.07154 | 13.51727 | 17.35716 | |
| d24 | 2.73663 | 2.84689 | 2.51489 | |
| Unit separation (a distance between an object and an image is 0.7 m) | | | | |
| d5 | 2.49430 | 30.59582 | 51.19639 | |
| d11 | 52.44395 | 25.52830 | 2.00000 | |
| d19 | 3.15409 | 7.31419 | 13.38222 | |
| d22 | 17.01686 | 11.58656 | 7.46822 | |
| d24 | 2.14131 | 2.22568 | 3.20387 | |

Zoom ratio 3.60
Unit focal length

| f1 | 126.30 |
|---|---|
| f2 | −35.94 |
| f3 | 28.37 |
| f4 | −33.59 |
| f5 | −42.91 |
| f6 | 32.12 |

Example 6

Unit mm

Surface data

| Surface no. | r | d | nd | νd |
|---|---|---|---|---|
| 1 | 149.7532 | 2.600 | 1.78470 | 26.29 |
| 2 | 92.0959 | 7.130 | 1.49700 | 81.61 |
| 3 | −543.5955 | 0.150 | | |

-continued

| Unit mm | | | | |
|---|---|---|---|---|
| 4 | 116.3793 | 5.260 | 1.49700 | 81.61 |
| 5 | ∞ | Variable | | |
| 6 | −198.3662 | 3.270 | 1.80810 | 22.76 |
| 7 | −55.3083 | 1.600 | 1.48749 | 70.23 |
| 8 | 32.8388 | 2.530 | 1.80000 | 29.84 |
| 9 | 40.4495 | 4.510 | | |
| 10 | −46.4774 | 1.500 | 1.83481 | 42.73 |
| 11 | ∞ | Variable | | |
| 12(Stop) | ∞ | 1.500 | | |
| 13* | 39.7338 | 5.950 | 1.49700 | 81.61 |
| 14* | −88.2841 | 8.360 | | |
| 15 | 70.0524 | 1.500 | 1.84666 | 23.78 |
| 16 | 32.5908 | 6.830 | 1.59282 | 68.63 |
| 17 | −54.5203 | 0.150 | | |
| 18 | 116.4107 | 3.410 | 1.49700 | 81.61 |
| 19 | −95.2276 | Variable | | |
| 20 | 1154.3052 | 2.080 | 1.92286 | 18.90 |
| 21 | −81.1301 | 1.000 | 1.74320 | 49.29 |
| 22* | 22.0464 | Variable | | |
| 23 | −540.5144 | 1.000 | 1.62004 | 36.26 |
| 24 | 28.0696 | Variable | | |
| 25* | 31.5339 | 11.060 | 1.80610 | 40.88 |
| 26 | −21.8578 | 1.300 | 1.64769 | 33.79 |
| 27 | ∞ | 25.4228 | | |
| 28 | ∞ | 4.000 | 1.51633 | 64.14 |
| 29 | ∞ | 0.800 | | |
| Image plane | ∞ | | | |

Aspherical surface data

13th surface k = 0
A4 = −1.5171E−06, A6 = 1.1539E−08, A8 = −3.1786E−12, A10 = 1.9839E−13

14th surface k = 0
A4 = 1.0771E−05, A6 = 1.2721E−08, A8 = −1.3493E−11, A10 = 2.5624E−13

22th surface k = −0.1328
A4 = −1.1938E−06, A6 = 4.5239E−09, A8 = −4.0899E−11, A10 = 6.4284E−14

25th surface k = −0.8952
A4 = 1.4130E−06, A6 = −1.2210E−09, A8 = −3.8678E−12, A10 = 0.0000E+00

| | WE | ST | TE |
|---|---|---|---|
| Various data (at the time of focusing at infinite distance) | | | |
| Focal length | 40.80 | 77.27 | 147.00 |
| Fno | 2.88 | 2.88 | 2.88 |
| Angle of view(2ω) | 30.91° | 15.90° | 8.30° |
| Image height IH | 10.82 | | |
| BF | 28.86 | 28.86 | 28.86 (in air) |
| Lens total length | 176.90 | 181.89 | 186.90 (in air) |
| Unit separation (at the time of focusing at infinite distance) | | | |
| d5 | 2.34098 | 34.50748 | 58.12650 |
| d11 | 50.26307 | 23.99478 | 2.00000 |
| d19 | 2.66816 | 4.95293 | 4.50967 |
| d22 | 17.34047 | 14.07832 | 18.29205 |
| d24 | 2.73571 | 2.81059 | 2.42016 |
| Unit separation (a distance between an object and an image is 0.7 m) | | | |
| d5 | 2.34098 | 34.50748 | 58.12650 |
| d11 | 50.26307 | 23.99478 | 2.00000 |
| d19 | 3.31869 | 7.48727 | 13.30976 |
| d22 | 17.28499 | 12.01200 | 8.68587 |
| d24 | 2.14118 | 2.34258 | 3.22628 |

-continued

| Unit mm | |
|---|---|
| Zoom ratio 3.60 | |
| Unit focal length | |
| f1 | 138.31 |
| f2 | −37.48 |
| f3 | 28.54 |
| f4 | −32.67 |
| f5 | −43.01 |
| f6 | 31.57 |

Correspondence values of the conditional expressions are shown as below.

| | Example1 | Example2 | Example3 | Example4 | Example5 | Example6 |
|---|---|---|---|---|---|---|
| ΔG4(W) | 0.615 | 0.534 | 0.650 | 0.620 | 0.650 | 0.651 |
| ΔG5(W) | 2.315 | 2.202 | 2.450 | 2.357 | 2.552 | 2.534 |
| ΔG4(S) | 8.740 | 8.502 | 9.031 | 8.829 | 9.200 | 8.800 |
| ΔG5(S) | 0.565 | 0.901 | 0.595 | 0.568 | 0.595 | 0.595 |
| ΔG4(T) | 0.739 | 0.978 | 0.609 | 0.646 | 0.621 | 0.468 |
| ΔG5(T) | −0.659 | 0.365 | −0.847 | −0.853 | −0.689 | −0.806 |

Note: 1) A distance between an object and an image from an infinite object point is an amount of focusing movement to 0.7 m.

Note: 2) A numerical value with a positive (+) sign indicates a movement toward the image side.

Aberration diagrams of the examples from the example 1 to example 6 are shown in FIG. 7A to FIG. 18L.

FIG. 7A, FIG. 7B, FIG. 7C, FIG. 7D, FIG. 7E, FIG. 7F, FIG. 7G, FIG. 7H, FIG. 7I, FIG. 7J, FIG. 7K, FIG. 7L,
FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L,
FIG. 11A, FIG. 11B, FIG. 11C, FIG. 11D, FIG. 11E, FIG. 11F, FIG. 11G, FIG. 11H, FIG. 11I, FIG. 11J, FIG. 11K, FIG. 11L,
FIG. 13A, FIG. 13B, FIG. 13C, FIG. 13D, FIG. 13E, FIG. 13F, FIG. 13G, FIG. 13H, FIG. 13I, FIG. 13J, FIG. 13K, FIG. 13L,
FIG. 15A, FIG. 15B, FIG. 15C, FIG. 15D, FIG. 15E, FIG. 15F, FIG. 15G, FIG. 15H, FIG. 15I, FIG. 15J, FIG. 15K, FIG. 15L,
FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams at the time of focusing at an infinite object point.

FIG. 8A, FIG. 8B, FIG. 8C, FIG. 8D, FIG. 8E, FIG. 8F, FIG. 8G, FIG. 8H, FIG. 8I, FIG. 8J, FIG. 8K, FIG. 8L,
FIG. 10A, FIG. 10B, FIG. 10C, FIG. 10D, FIG. 10E, FIG. 10F, FIG. 10G, FIG. 10H, FIG. 10I, FIG. 10J, FIG. 10K, FIG. 10L,
FIG. 12A, FIG. 12B, FIG. 12C, FIG. 12D, FIG. 12E, FIG. 12F, FIG. 12G, FIG. 12H, FIG. 12I, FIG. 12J, FIG. 12K, FIG. 12L,
FIG. 14A, FIG. 14B, FIG. 14C, FIG. 14D, FIG. 14E, FIG. 14F, FIG. 14G, FIG. 14H, FIG. 14I, FIG. 14J, FIG. 14K, FIG. 14L,
FIG. 16A, FIG. 16B, FIG. 16C, FIG. 16D, FIG. 16E, FIG. 16F, FIG. 16G, FIG. 16H, FIG. 16I, FIG. 16J, FIG. 16K, FIG. 16L,
FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams when a distance between an object and an image is 0.7 m.

In these aberration diagrams,

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, FIG. 17A, and FIG. 18A show a spherical aberration (SA) at the wide angle end, FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, FIG. 17B, and FIG. 18B show an astigmatism (AS) at the wide angle end, FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, FIG. 17C, and FIG. 18C show a distortion (DT) at the wide angle end, FIG. 1D, FIG. 2D, FIG. 3D, FIG. 4D, FIG. 5D, FIG. 6D, FIG. 7D, FIG. 8D, FIG. 9D, FIG. 10D, FIG. 11D, FIG. 12D, FIG. 13D, FIG. 14D, FIG. 15D, FIG. 16D, FIG. 17D, and FIG. 18D show a chromatic aberration of magnification (CC) at the wide angle end, FIG. 1E, FIG. 2E, FIG. 3E, FIG. 4E, FIG. 5E, FIG. 6E, FIG. 7E, FIG. 8E, FIG. 9E, FIG. 10E, FIG. 11E, FIG. 12E, FIG. 13E, FIG. 14E, FIG. 15E, FIG. 16E, FIG. 17E, and FIG. 18E show a spherical aberration (SA) in the intermediate focal length state, FIG. 1F, FIG. 2F, FIG. 3F, FIG. 4F, FIG. 5F, FIG. 6F, FIG. 7F, FIG. 8F, FIG. 9F, FIG. 10F, FIG. 11F, FIG. 12F, FIG. 13F, FIG. 14F, FIG. 15F, FIG. 16F, FIG. 17F, and FIG. 18F show an astigmatism (AS) in the intermediate focal length state, FIG. 1G, FIG. 2G, FIG. 3G, FIG. 4G, FIG. 5G, FIG. 6G, FIG. 7G, FIG. 8G, FIG. 9G, FIG. 10G, FIG. 11G, FIG. 12G, FIG. 13G, FIG. 14G, FIG. 15G, FIG. 16G, FIG. 17G, FIG. 18G show a distortion (DT) in the intermediate focal length state, FIG. 1H, FIG. 2H, FIG. 3H, FIG. 4H, FIG. 5H, FIG. 6H, FIG. 7H, FIG. 8H, FIG. 9H, FIG. 10H, FIG. 11H, FIG. 12H, FIG. 13H, FIG. 14H, FIG. 15H, FIG. 16H, FIG. 17H, and FIG. 18H show a chromatic aberration of magnification (CC) in the intermediate focal length state, FIG. 1I, FIG. 2I, FIG. 3I, FIG. 4I, FIG. 5I, FIG. 6I, FIG. 7I, FIG. 8I, FIG. 9I, FIG. 10I, FIG. 11I, FIG. 12I, FIG. 13I, FIG. 14I, FIG. 15I, FIG. 16I, FIG. 17I, and FIG. 18I show a spherical aberration (SA) at the telephoto end, FIG. 1J, FIG. 2J, FIG. 3J, FIG. 4J, FIG. 5J, FIG. 6J, FIG. 7J, FIG. 8J, FIG. 9J, FIG. 10J, FIG. 11J, FIG. 12J, FIG. 13J, FIG. 14J, FIG. 15J, FIG. 16J, FIG. 17J, and FIG. 18J show an astigmatism (AS) at the telephoto end, FIG. 1K, FIG. 2K, FIG. 3K, FIG. 4K, FIG. 5K, FIG. 6K, FIG. 7K, FIG. 8K, FIG. 9K, FIG. 10K, FIG. 11K, FIG. 12K, FIG. 13K, FIG. 14K, FIG. 15K, FIG. 16K, FIG. 17K, and FIG. 18K show a distortion (DT) at the telephoto end, and FIG. 1L, FIG. 2L, FIG. 3L, FIG. 4L, FIG. 5L, FIG. 6L, FIG. 7L, FIG. 8L, FIG. 9L, FIG. 10L, FIG. 11L, FIG. 12L, FIG. 13L, FIG. 14L, FIG. 15L, FIG. 16L, FIG. 17L, and FIG. 18L show a chromatic aberration of magnification (CC) at the telephoto end. In the aberration diagrams, FIY denotes the maximum image height, and ω denotes a half angle of view.

Correspondence values of the conditional expressions are shown as below.

| Conditional expressions | Example 1 | Example 2 | Example 3 |
|---|---|---|---|
| (1) $|f_2|/f_3$ | 1.371 | 1.541 | 1.334 |
| (2) $\Delta G_1/\Delta G_2$ | 0.000 | 0.000 | 0.000 |
| (3) $\Delta G_2/f_3$ | 1.905 | 2.137 | 1.835 |
| (4) $v_{1p}$ | 88.27 | 84.81 | 88.27 |
| (5) $(r_1 + r_2)/(r_1 - r_2)$ | 1.437 | 1.048 | 1.497 |
| (6) $v_{2p}$ | 23.78 | 23.78 | 26.81 |
| (7) $v_{3p}$ | 77.28 | 71.87 | 77.28 |
| (8) $f_{3F}/f_{3R}$ | 1.353 | 1.020 | 1.290 |
| (9) $d(A)/f_3$ | 0.214 | 0.185 | 0.224 |
| (10) $n_{3p}$ | 1.545 | 1.560 | 1.545 |
| (11) $n_{4p}$ | 1.92286 | 1.92286 | 1.92286 |
| (12) $\Delta v_4$ | 30.39 | 30.39 | 30.39 |
| (13) $|\Delta G_{5(W)}/\Delta G_{4(W)}|$ | 0.919 | 1.686 | 0.915 |

| Conditional expressions | Example 4 | Example 5 | Example 6 |
|---|---|---|---|
| (1) $|f_2|/f_3$ | 1.308 | 1.267 | 1.313 |
| (2) $\Delta G_1/\Delta G_2$ | 0.000 | 0.000 | 0.218 |
| (3) $\Delta G_2/f_3$ | 1.828 | 1.716 | 1.604 |
| (4) $v_{1p}$ | 88.27 | 88.27 | 81.61 |
| (5) $(r_1 + r_2)/(r_1 - r_2)$ | 1.708 | 1.816 | 1.773 |
| (6) $v_{2p}$ | 26.30 | 26.30 | 26.30 |
| (7) $v_{3p}$ | 77.28 | 77.28 | 77.28 |
| (8) $f_{3F}/f_{3R}$ | 1.345 | 1.280 | 1.339 |
| (9) $d(A)/f_3$ | 0.284 | 0.256 | 0.293 |
| (10) $n_{3p}$ | 1.545 | 1.545 | 1.545 |
| (11) $n_{4p}$ | 1.92286 | 1.92286 | 1.92286 |
| (12) $\Delta v_4$ | 30.39 | 30.39 | 30.39 |
| (13) $|\Delta G_{5(W)}/\Delta G_{4(W)}|$ | 0.916 | 0.916 | 0.914 |

Figure 19:
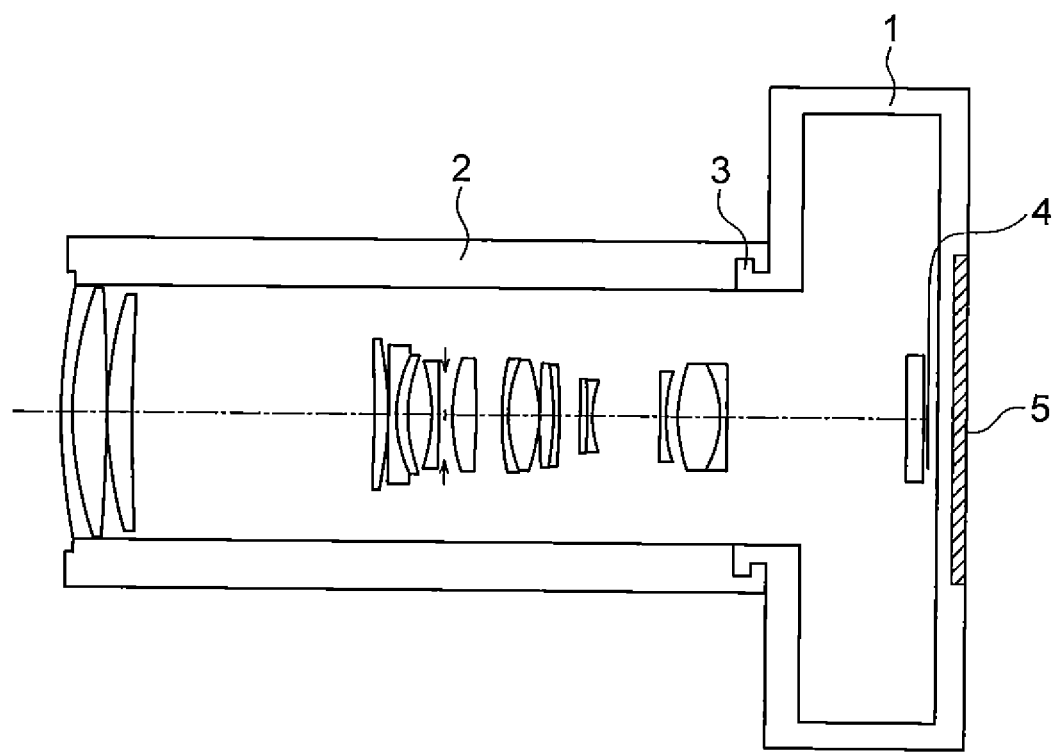
FIG. 19 is a cross-sectional view of an interchangeable lens camera in which, the zoom lens according to the present invention is used as a photographic optical system.

FIG. 19 is a cross-sectional view of a single-lens mirrorless camera as an electronic image pickup apparatus. In FIG. 19, a taking lens system 2 is disposed inside a lens barrel of a single-lens mirrorless camera 1. A mount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the image forming lens system described in any one of the examples from the first example to the sixth example is to be used.

Figure 20:
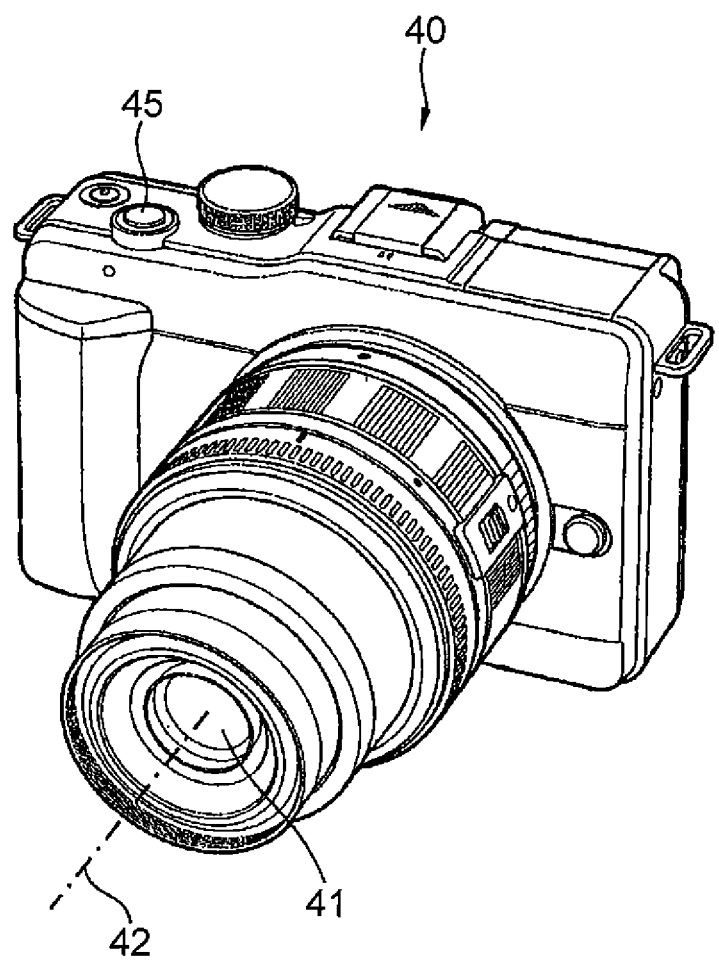
FIG. 20 is a front perspective view showing an appearance of an interchangeable lens camera.
Figure 21:
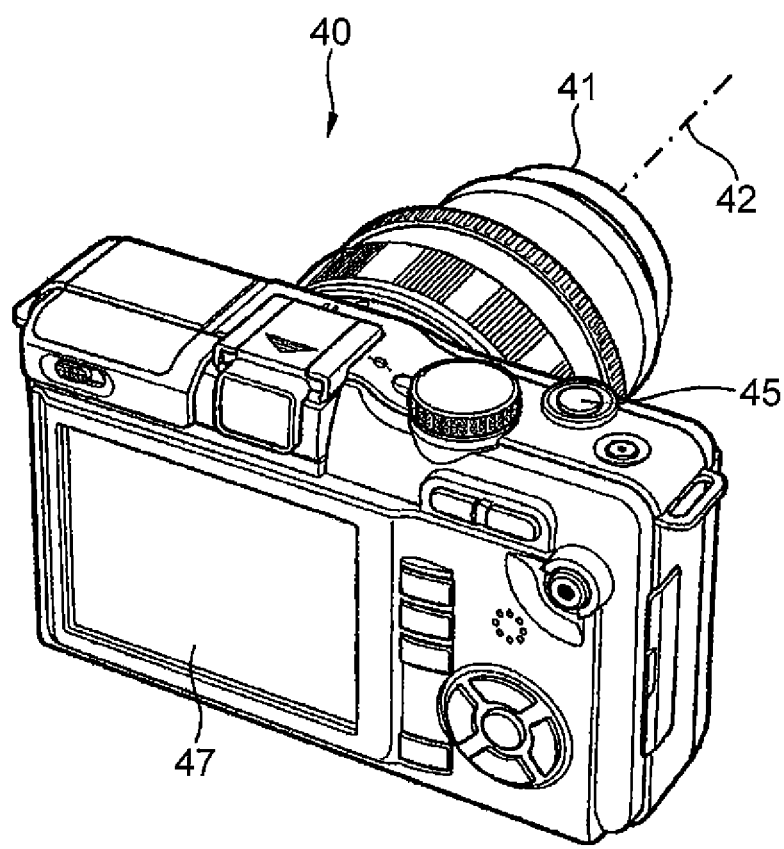
FIG. 21 is a rear perspective view of the interchangeable lens camera.

FIG. 20 and FIG. 21 are conceptual diagrams of an arrangement of the image pickup apparatus according to the present invention. FIG. 20 is a front perspective view showing an appearance of a digital camera 40 as the image pickup apparatus, and FIG. 21 is a rear perspective view of the digital camera 40. The image forming lens system, or an inner focus lens system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the inner focus lens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 22 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 22, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the digital camera 40 in which such an arrangement is made, by adopting the inner focus lens system according to the present invention as the photographing optical system 41, it is possible to achieve the image pickup apparatus for photography with high resolution without a degradation of an image quality.

As it has been described heretofore, the zoom lens according to the present invention is suitable for a telephoto zoom lens having a large aperture and high performance, which can be used for an interchangeable lens application, and which is preferable also for video photography in particular, and a zoom lens apparatus which includes such telephoto zoom lens.

According to the present invention, it is possible to provide a zoom lens of a small size which is advantageous for securing both of a zooming ratio and brightness, and a zoom lens apparatus which includes such zoom lens. Particularly, it is possible to provide a telephoto zoom lens having a large aperture and high performance, which can be used for an interchangeable lens application and which is preferable also for video photography in particular, and a zoom lens apparatus which includes such telephoto zoom lens.

What is claimed is:

1. A zoom lens comprising in order from an object side to an image side:
a first lens unit having a positive refractive power;
a second lens unit having a negative refractive power;
a third lens unit having a positive refractive power; and
a fourth lens unit, wherein
at a telephoto end, with respect to a wide angle end,
a distance between the first lens unit and the second lens unit widens, and a distance between the second lens unit and the third lens unit narrows, and
at the time of zooming from the wide angle end to the telephoto end,
a distance between the third lens unit and the fourth lens unit changes, and
the zoom lens satisfies the following conditional expressions (1) and (2)

$$1.1 < |f_2|/f_3 < 1.8 \quad (1)$$

$$-0.5 < \Delta G_1/\Delta G_2 < 0.5 \quad (2)$$

where,
$f_2$ denotes a focal length of the second lens unit,
$f_3$ denotes a focal length of the third lens unit,
$\Delta G_1$ denotes a difference in a position of the first lens unit at the wide angle end and a position of the first lens unit at the telephoto end,
$\Delta G_1$ is let to have a positive sign when the first lens unit is positioned on the object side at the telephoto end with respect to the wide angle end, and $\Delta G1$ is let to have a negative sign when the first lens unit is positioned on the image side at the telephoto end with respect to the wide angle end, and
$\Delta G_2$ denotes an absolute value of the maximum amount of movement of the second lens unit at the time of zooming from the wide angle end to the telephoto end.

2. The zoom lens according to one of claim 1, wherein the fourth lens unit has a negative refractive power.

3. The zoom lens according to claim 1, wherein at the time of zooming from the wide angle end to the telephoto end, the third lens unit it stationary.

4. The zoom lens according to claim 1, comprising:
a lens unit nearest to the image side having a positive refractive power, which is disposed on the image side of the fourth lens unit, and which is stationary at the time of zooming from the wide angle end to the telephoto end.

5. The zoom lens according to claim 1, wherein
the fourth lens unit is a focusing lens unit which moves at the time of focusing from an infinite object point to an object point at a close distance.

6. The zoom lens according to claim 5, wherein the fourth lens unit and the fifth lens unit move by a different amount of movement at the time of focusing from an infinite object point to an object point at a close distance.

7. The zoom lens according to claim 6, wherein the fourth lens unit and the fifth lens unit satisfy the following conditional expression (13)

$$0.2 < |\Delta G_{5(W)}/\Delta G_{4(W)}| < 3.0 \quad (13)$$

where,
$\Delta G_{4(W)}$ denotes an amount of movement of the fourth lens unit at the time of focusing from an infinite object point to an object point at a close distance at the wide angle end, and
$\Delta G_{5(W)}$ denotes an amount of movement of the fifth lens unit at the time of focusing from an infinite object point to an object point at a close distance at the wide angle end.

8. The zoom lens according to claim 1, wherein
the first lens unit includes in order from the object side to the image side, a cemented lens of a negative meniscus lens and a biconvex positive lens, and a positive meniscus lens having a convex surface directed toward the object side, and
the zoom lens satisfies the following conditional expression (4)

$$70 < v_{1p} < 100 \quad (4)$$

where,
$v_{1p}$ denotes an average value of Abbe's number for a d-line of the positive lenses in the first lens unit.

9. The zoom lens according to claim 1, wherein
the second lens unit includes in order from the object side to the image side, a positive lens, a cemented negative lens, and a negative lens, and
in the cemented negative lens, a biconcave negative lens and a positive meniscus lens are cemented.

10. The zoom lens according to claim 9, wherein the second lens unit satisfies the following conditional expressions (5) and (6)

$$0.9 < (r_1 + r_2)/(r_1 - r_2) < 2.2 \quad (5)$$

$$18 < v_{2p} < 28 \quad (6)$$

where,
$r_1$ denotes a radius of curvature of a surface on the object side of the positive lens disposed nearest to the object in the second lens unit,
$r_2$ denote a radius of curvature of a surface on the image side of the positive lens disposed nearest to the object in the second lens unit, and
$v_{2p}$ denotes an average value of Abbe's number for a d-line of the positive lenses in the second lens unit.

11. The zoom lens according to claim 1, wherein the third lens unit includes in order from the object side to the image side, an aperture stop, a biconvex positive lens, a cemented positive lens of a negative meniscus lens and a biconvex positive lens, and a biconvex positive lens or a cemented positive lens of a biconvex positive lens and a negative meniscus lens.

12. The zoom lens according to claim 1, wherein
the third lens unit includes in order from the object side to the image side, an aperture stop, a first positive lens component, a second positive lens component, and a third lens component, where
a lens component means a lens having only two refracting surfaces which are in contact with air in a normal optical path, an object-side surface and an image-side surface, and refers to one of a single lens and a cemented lens.

13. The zoom lens according to claim 12, wherein the first positive lens component in the third lens unit has an aspheric lens surface.

14. The zoom lens according to claim 12, wherein
the first positive lens component and the second positive lens component are disposed with the maximum air space in between, in an axial air space in the third lens unit, and
the zoom lens satisfies one of following conditional expressions (7), (8), (9), and (10)

$$65 < v_{3p} < 100 \quad (7)$$

$$0.5 < f_{3F}/f_{3R} < 2.0 \quad (8)$$

$$0.1 < d(A)/f_3 < 0.5 \quad (9)$$

$$1.45 < n_{3p} < 1.65 \quad (10)$$

where,
$v_{3p}$ denotes an average value of Abbe's number for a d-line of positive lenses in the third lens unit,
$f_{3F}$ denotes a focal length of the first positive lens component in the third lens unit,
$f_{3R}$ denotes a composite focal length of the second positive lens component and the third positive lens component,
$d(A)$ denotes a distance between the first positive lens component and the second positive lens component,
$f_3$ denotes a focal length of the third lens unit, and
$n_{3p}$ denotes an average value of a refractive index for the d-line of the positive lenses in the third lens unit.

15. The zoom lens according to claim 1, wherein
the fourth lens unit includes a cemented negative lens of a positive lens and a biconcave negative lens, and
the zoom lens satisfies the following conditional expressions (11) and (12)

$$1.80 < n_{4p} < 2.00 \quad (11)$$

$$15 < \Delta v_4 < 40 \quad (12)$$

where,
$n_{4p}$ denotes a refractive index for a d-line of the positive lens in the fourth lens unit, and
$\Delta v_4$ denotes a difference in Abbe's number for the d-line of the positive lens in the fourth lens unit and Abbe's number for the d-line of the negative lens in the fourth lens unit.

16. A zoom lens apparatus comprising:
a zoom lens according to claim 1; and
a mount portion which enables to connect the zoom lens to a camera main-body.

17. A zoom lens comprising in order from an object side to an image side:
a first lens unit having a positive refractive power;
a second lens unit having a negative refractive power;
a third lens unit having a positive refractive power; and
a fourth lens unit, wherein
at a telephoto end, with respect to a wide angle end,
a distance between the first lens unit and the second lens unit widens, and a distance between the second lens unit and the third lens unit narrows, and
at the time of zooming from the wide angle end to the telephoto end,
a distance between the third lens unit and the fourth lens unit changes, and
the zoom lens satisfies the following conditional expressions (1) and (3)

$$1.1 < |f_2|/f_3 < 1.8 \quad (1)$$

$$0.8 < \Delta G_2/f_3 < 2.8 \quad (3)$$

where,
$f_2$ denotes a focal length of the second lens unit,
$f_3$ denotes a focal length of the third lens unit, and
$\Delta G_2$ denotes an absolute value of the maximum amount of movement of the second lens unit at the time of zooming from the wide angle end to the telephoto end.

18. A zoom lens comprising in order from an object side to an image side:
a first lens unit having a positive refractive power;
a second lens unit having a negative refractive power;
a third lens unit having a positive refractive power; and
a fourth lens unit, wherein
at a telephoto end, with respect to a wide angle end,
a distance between the first lens unit and the second lens unit widens, and a distance between the second lens unit and the third lens unit narrows, and
at the time of zooming from the wide angle end to the telephoto end,
the first lens unit is stationary, and a distance between the third lens unit and the fourth lens unit changes, and
the zoom lens satisfies the following conditional expression (1)

$$1.1 < |f_2|/f_3 < 1.8 \quad (1)$$

where,
$f_2$ denotes a focal length of the second lens unit, and
$f_3$ denotes a focal length of the third lens unit.

19. A zoom lens comprising in order from an object side to an image side:
a first lens unit having a positive refractive power;
a second lens unit having a negative refractive power;
a third lens unit having a positive refractive power; and
a fourth lens unit having a negative refractive power, wherein
at a telephoto end, with respect to a wide angle end,
a distance between the first lens unit and the second lens unit widens, and a distance between the second lens unit and the third lens unit narrows, and
at the time of zooming from the wide angle end to the telephoto end,
a distance between the third lens unit and the fourth lens unit changes, and the second lens unit includes a positive lens which is a lens disposed nearest to the object, in the second lens unit, and the positive lens has a concave object side surface directed toward an object side and has a convex image side surface directed toward an image side.

20. The zoom lens according to claim 19, wherein the positive lens of the second lens unit, which positive lens is the lens disposed nearest to the object, in the second lens unit, is a single lens of which both surfaces are contacted with air.

21. A zoom lens comprising in order from an object side to an image side:
a first lens unit having a positive refractive power;
a second lens unit having a negative refractive power;
a third lens unit having a positive refractive power;
a fourth lens unit having a negative refractive power;
a fifth lens unit having a negative refractive power; and
a sixth lens unit having a positive refractive power, wherein
at a telephoto end, with respect to a wide angle end,
a distance between the first lens unit and the second lens unit widens, and a distance between the second lens unit and the third lend unit narrows, and
at the time of zooming from the wide angle end to the telephoto end,
a distance between the third lens unit and the fourth lens unit changes, and a distance between the fourth lens unit and the fifth lens unit changes, and a distance between the fifth lens unit and the sixth lens unit changes, and
the zoom lens satisfies the following conditional expression (1)

$$1.1 < |f_2|/f_3 < 1.8 \quad (1)$$

where,
$f_2$ denotes a focal length of the second lens unit, and
$f_3$ denotes a focal length of the third lens unit.

22. The zoom lens according to claim 21, wherein at the time of zooming from the wide angle end to the telephoto end, the first lens unit is stationary.

23. The zoom lens according to claim 21, wherein at the time of zooming from the wide angle end to the telephoto end, an amount of movement of the second lens unit is larger than an amount of movement of the first lens unit.

24. The zoom lens according to claim 21, wherein at the time of zooming from the wide angle end to the telephoto end, the second lens unit moves only toward the image side.

25. The zoom lens according to claim 21, wherein at the time of zooming from the wide angle end to the telephoto end, the third lens unit is stationary.

26. The zoom lens according to claim 21, wherein at the time of zooming from the wide angle end to the telephoto end, the third lens unit moves toward the image side, and changes direction of movement to move toward the object side.

27. The zoom lens according to claim 21, wherein at the time of zooming from the wide angle end to the telephoto end, the fourth lens unit moves toward the image side, and changes direction of movement to move toward the object side.

* * * * *